(12) United States Patent
Dewan

(10) Patent No.: US 7,617,269 B2
(45) Date of Patent: Nov. 10, 2009

(54) LOGIC ENTITY WITH TWO OUTPUTS FOR EFFICIENT ADDER AND OTHER MACRO IMPLEMENTATIONS

(75) Inventor: Hitanshu Dewan, Delhi (IN)

(73) Assignee: STMicroelectronics Pvt. Ltd., Uttar Pradesh (IN)

( * ) Notice: Subject to any disclaimer, the term of this patent is extended or adjusted under 35 U.S.C. 154(b) by 859 days.

(21) Appl. No.: 11/196,797

(22) Filed: Aug. 3, 2005

(65) Prior Publication Data

US 2006/0059222 A1   Mar. 16, 2006

(30) Foreign Application Priority Data

Aug. 3, 2004    (IN) .................. 1441/DEL/2004

(51) Int. Cl.
*G06F 7/50* (2006.01)
(52) U.S. Cl. ...................................... 708/700
(58) Field of Classification Search ................ None
See application file for complete search history.

(56) References Cited

U.S. PATENT DOCUMENTS

| | | | | |
|---|---|---|---|---|
| 5,349,250 A | * | 9/1994 | New ............................ 326/44 |
| 5,481,206 A | * | 1/1996 | New et al. ...................... 326/38 |
| 5,724,276 A | * | 3/1998 | Rose et al. .................... 708/235 |
| 7,218,139 B1 | * | 5/2007 | Young et al. ................... 326/38 |
| 7,302,460 B1 | * | 11/2007 | Langhammer .............. 708/700 |

* cited by examiner

*Primary Examiner*—David H Malzahn

(57) ABSTRACT

An improved logic entity with two outputs for efficient adder and other macro implementations providing fast response with reduced area requirements, comprising a first lookup table for generating a first output for the carry out value for a carry-in of zero and a second output for the sum value for a carry-in of one; a second lookup table for generating a first output for the carry out value for a carry-in of one and a second output for the sum value for a carry-in of zero; a first multiplexer is connected to a first input from the first output of the first lookup table and a second input from the first output of the second lookup table; a second multiplexer is connected to a first input from the second output of the first lookup table and a second input from the second output of the second lookup table; thereby, getting two output taps for sum and carry implementation.

20 Claims, 24 Drawing Sheets

Schematic Symbol For Full Adder

|   | A | B | $C_{IN}$ | $C_{OUT}$ |
|---|---|---|---|---|
| 1 | 0 | 0 | 0 | 0 |
| 2 | 0 | 0 | 1 | 0 |
| 3 | 0 | 1 | 0 | 0 |
| 4 | 1 | 0 | 0 | 0 |
| 5 | 0 | 1 | 1 | 1 |
| 6 | 1 | 0 | 1 | 1 |
| 7 | 1 | 1 | 0 | 1 |
| 8 | 1 | 1 | 1 | 1 |

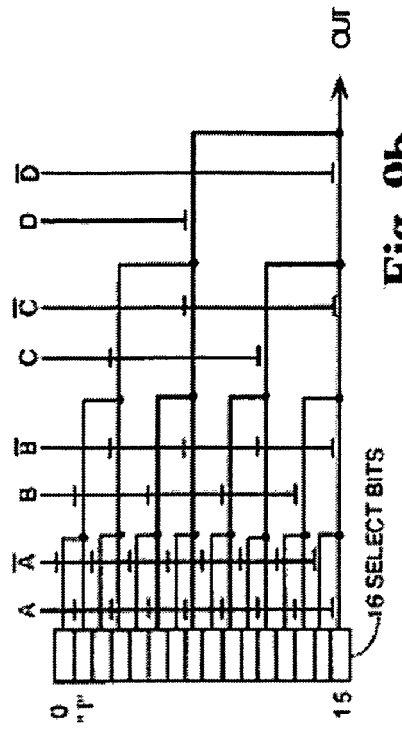
Fig. 9b
Prior Art
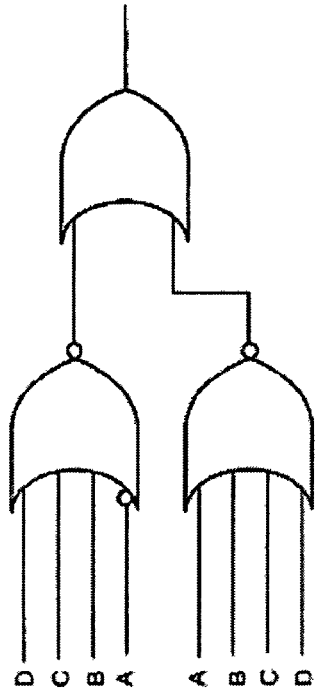
Fig. 9d
Prior Art
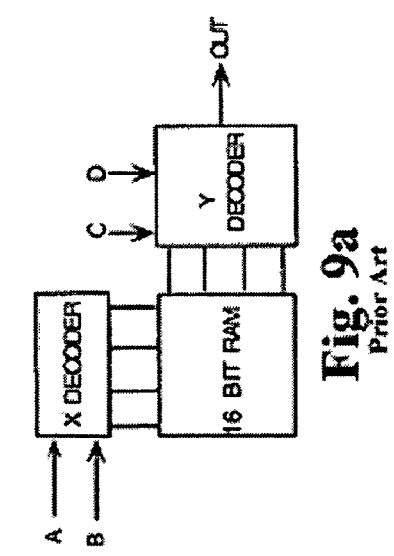
Fig. 9a
Prior Art
Fig. 9c
Prior Art

| A | B | $C_{in}$ | $C_{out}$ | S |
|---|---|---|---|---|
| 0 | 0 | 0 | 0 | 0 |
| 0 | 1 | 0 | 0 | 1 |
| 1 | 0 | 0 | 0 | 1 |
| 1 | 1 | 0 | 1 | 0 |
| 0 | 0 | 1 | 0 | 1 |
| 0 | 1 | 1 | 1 | 0 |
| 1 | 0 | 1 | 1 | 0 |
| 1 | 1 | 1 | 1 | 1 |

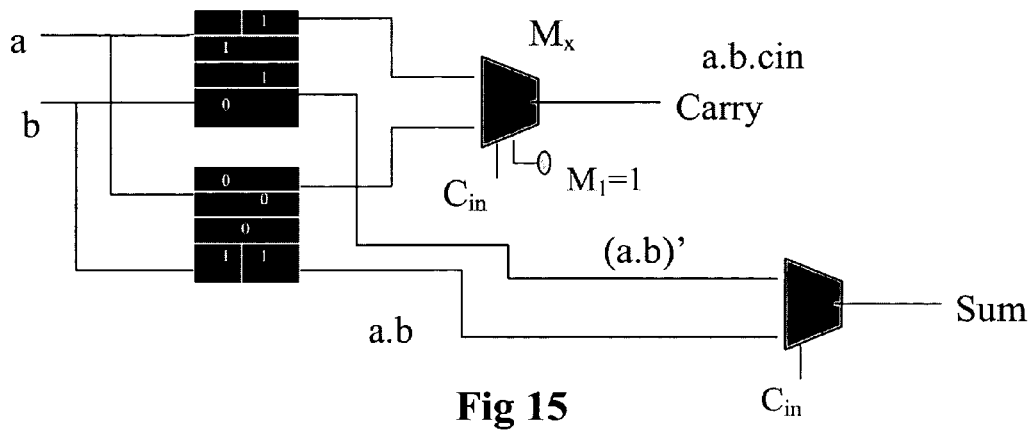
Fig 15
| Cin | B | A | A.B | S | C |
|---|---|---|---|---|---|
| 0 | 0 | 0 | 0 | 0 | 0 |
| 0 | 0 | 1 | 0 | 0 | 0 |
| 0 | 1 | 0 | 0 | 0 | 0 |
| 0 | 1 | 1 | 1 | 1 | 0 |
| 1 | 0 | 0 | 0 | 1 | 0 |
| 1 | 0 | 1 | 0 | 1 | 0 |
| 1 | 1 | 0 | 0 | 1 | 0 |
| 1 | 1 | 1 | 1 | 0 | 1 |
Fig 15(a)
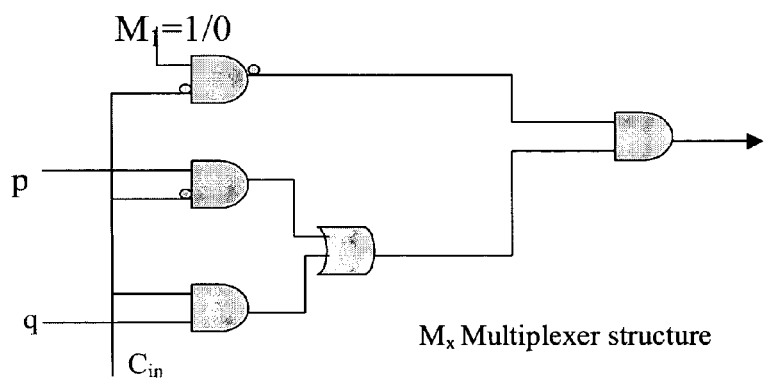
$M_x$ Multiplexer structure
Fig 15(b)

| I3 | I2 | I1 | I0 | S1 | S0 |
|----|----|----|----|----|----|
| 0  | 0  | 0  | 1  | 0  | 0  |
| 0  | 0  | 1  | 0  | 0  | 1  |
| 0  | 1  | 0  | 0  | 1  | 0  |
| 1  | 0  | 0  | 0  | 1  | 1  |
Fig. 20(a)
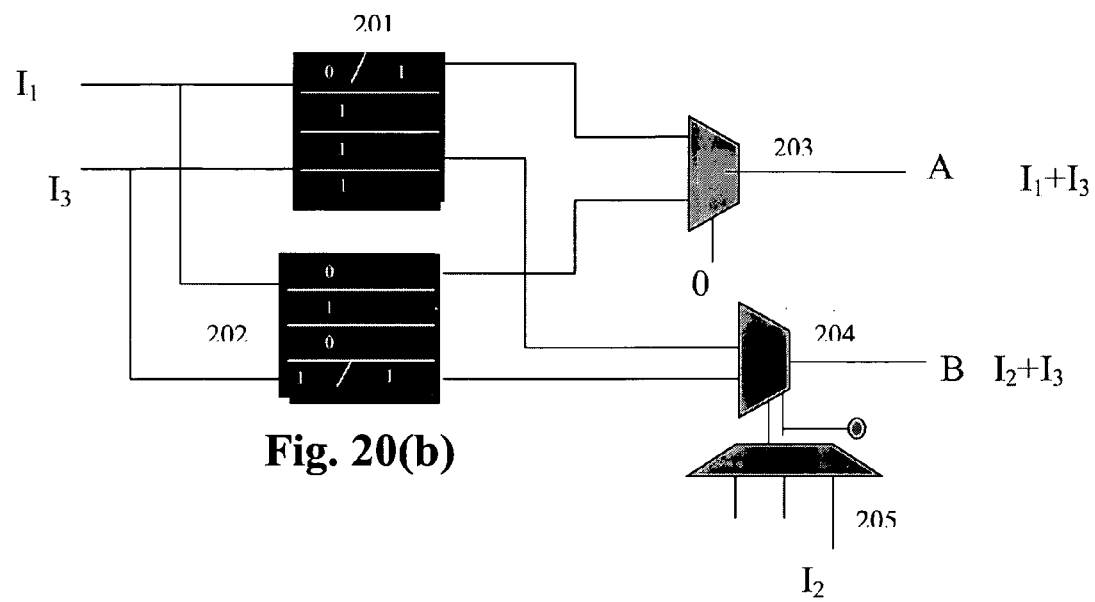
Fig. 20(b)
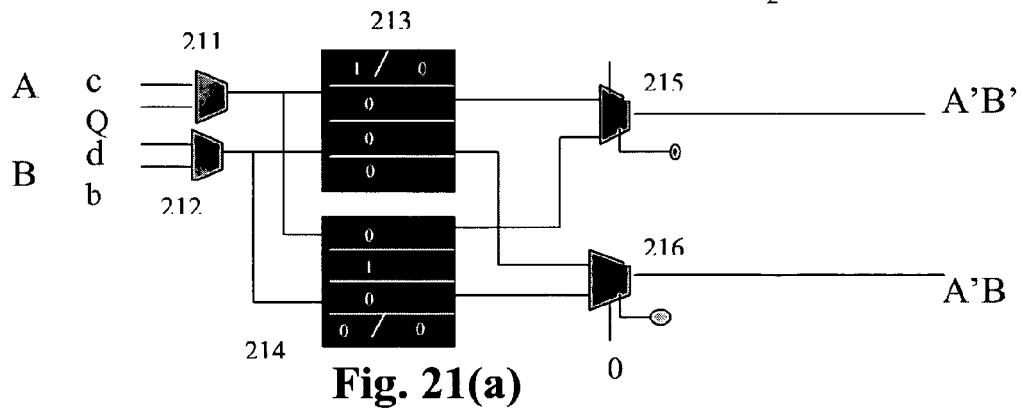
Fig. 21(a)

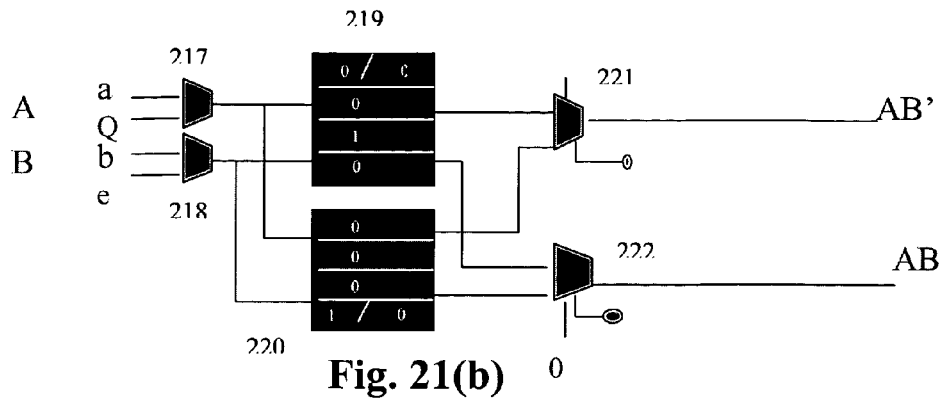
Fig. 21(b)
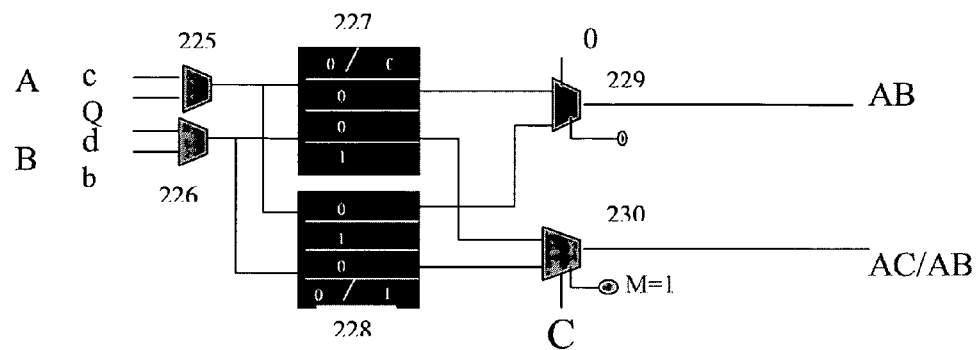
Fig. 22(a)
Fig. 22(b)

LOGIC ENTITY WITH TWO OUTPUTS FOR EFFICIENT ADDER AND OTHER MACRO IMPLEMENTATIONS

TECHNICAL FIELD OF THE INVENTION

The present invention relates to an improved logic entity with two outputs for efficient adder and other macro implementations.

BACKGROUND OF THE INVENTION

Programmable logic devices are greatly used to perform arithmetic operations. They use configurable logic blocks, lookup tables or combinational logic to implement the same. Lookup tables employed for performing elementary logic functions also perform functions like addition, subtraction, multiplication etc. As known, one of the basic macro needed to be implemented efficiently in a LUT based PLB is an Adder/Subtractor.

By reference to FIGS. 1a, 1b and 2, it will be explained how the speed of a single bit ripple carry adder (FIGS. 1a and 1b), and thus a multi-bit ripple carry adder constructed by cascading single bit adders (FIG. 2) is constrained by the speed at which the signal at the carry-in terminal is propagated to the carry-out terminal.

The Boolean logic equations governing the behaviour of the single bit adder shown in FIG. 1a are:

$$S_i = (A_i @ B_i) @ C_i \quad (1)$$

$$C_{i+1} = A_i.B_i + (A_i @ B_i).C_i \quad (2)$$

where

@ represents the exclusive-or (XOR) function, "." represents the AND function, and + represents the OR function.

Eq.(1) shows that the sum is a function of a carry-in from a less significant bit in addition to the single bits $A_i$ and $B_i$ being added. The ripple carry adder algorithm of Eqs. (1) and (2) shows that the sum for a particular bit cannot be calculated until the carry-out from the previous bit is available. The sum $S_i$ is the output of an XOR gate and cannot be generated until each of its inputs, one of which is the carry-in signal $C_i$, is available. Furthermore, the carry-out $C_{i+1}$ also cannot be generated until the less significant carry bit $C_i$ is available.

Referring now to FIG. 2, the propagation of the carry signal through successive stages of a ripple carry adder will be explained. AND gate 67 in the second adder stage $Add_{i+1}$ receives one of its inputs from the output of XOR gate 66 after only 1 gate delay. However, assuming that the carry-in signal $C_i$ is preset (that is, that $Add_i$ is the least significant bit), AND gate 67 could wait an additional 3 gate delays for the effect of $A_i$ and $B_i$ to propagate through gates 61, 62 and 65 before its other input, the carry-out $C_{i+1}$ from the less significant bit, has been generated from the carry out of the less significant bit $C_i$ and the less significant bits $A_i$ and $B_i$ to be added. Furthermore, the carry-out $C_{i+2}$ of the second bit $Add_{i+1}$ is further delayed through 2 more gates after the carry bit $C_{i+1}$ has been generated. That is, combining the inputs on $A_{i+1}$ and $B_{i+1}$ with the carry in signal $C_{in}$ to generate $C_{i+2}$ requires that $C_{i+1}$ propagate through AND gate 67 and OR gate 70. Thus, there will not be a valid carry-in signal $C_{i+2}$ for input to a third stage until 5 gate delays after the application of the input signals $A_i$ and $B_i$. Thus, the speed of the conventional ripple carry adder is constrained by the speed of propagation of the carry signal. The propagation delay of a conventional ripple carry adder is 2n+1 gates where n is the number of stages in the multi-bit adder.

Since addition is the foundation of many other important functions and operations, it has been important to the computer industry to devise faster adder circuits by speeding up the carry propagation time. In general, these methods work by trading component density and complexity for carry propagation speed.

One well-known algorithm, which achieves a faster carry propagation speed is called look-ahead carry logic. A circuit for implementing look-ahead carry logic is shown in FIG. 3. Understanding this logic requires the introduction of two new variables:

$$P_i = A_i @ B_i \quad (3)$$

$$G_i = A_i.B_i \quad (4)$$

The variable P is called "carry propagate" because when P is high, carry-in is propagated to carry-out. The variable G is called "carry generate" because when G is high, a carry-out is generated by the bits being added. Eqs. (1) and (2) can be rewritten in terms of these new variables:

$$S_i = P_i @ C_i \quad (5)$$

$$C_{i+1} = G_i + P_i.C_i \quad (6)$$

With some minor algebraic manipulation, Eq. (6) can be used to write new equations where the carry bit at each level is dependent only on the addends at each level and the least significant carry bit. The following equations are implemented in the four-bit adder shown in FIG. 3:

$$C_1 = A_0.B_0 = G_0 \quad (7a)$$

$$C_2 = G_1 + P_1.C_1 = G_1 + P_1.C_1 \quad (7b)$$

$$C_3 = G_2 + P_2.C_2 = G_2 + P_2(G_1 + P_1.C_1) = G_2 + P_2.G_1 + P_2.P_1.C_1 \quad (7c)$$

$$C_4 = G_3 + P_3.C_3 = G_3 + P_3.(G_2 + P_2.G_1 + P_2.P_1.C_1) = G_3 + P_3.G_2 + P_3.P_2.G_1 + P_3.P_2.P_1.C_1 \quad (7d)$$

Each $G_i$ and $P_i$ is a function only of $A_i$ and $B_i$ and not of previous carry values, as can be seen in Eqs. 3 and 4. Second, note in Eq. 7 that $C_2$ is calculated as a function of $G_1$, $P_1$, and $C_1$, and that in Eq. 7c, $C_3$ is calculated as a function of $G_2$, $P_2$ and $C_2$. But since $C_2$ has been solved in terms of $C_1$, $C_3$ can also be solved in terms of $C_1$. Attention to Eq. 7d, and the more general Eq. 6 will reveal that each $C_{i+1}$ is a function of several $G_i$'s, $P_i$'s, and $C_1$. As can be seen in FIG. 3, the less significant bit is fed into the next significant bit only for the calculation of the sum, not for the calculation of the carry bit. Since each carry bit is a function of several $G_i$'s, $P_i$'s, and $C_1$, each carry bit is not dependent on the carry-out of any but the least significant bit. Thus the carry propagation delay of the look-ahead carry circuit is independent of the number of bits being added.

Referring still to FIG. 3 and FIG. 1a, the delay from the application of the input signals (A's and B's) to the appearance of a valid signal at the generate outputs ($G_i$'s) and propagate outputs ($P_i$'s) of an adder stage is 1 gate (this can be discerned from FIG. 1a). The delay added in FIG. 3 by the carry restorer portion of the look ahead carry circuitry is 2 gates, which makes a total of a 3-gate delay from the application of the input signals to the adder until the last carry-out bit is available. This relationship is independent of the number of bits being added. For a multibit adder circuit, the delay will be significantly less than the delay of a conventional ripple carry adder circuit. However, as the number of stages is increased, the number of components increases significantly. Look ahead carry logic requires many more components than the conventional ripple carry adder to implement a stage of a multi-bit adder. This illustrates the idea that faster carry-propagation requires higher component density.

FIG. 4 (4a, 4b, 4c & 4d) shows another example of circuit components for implementing an adder. The adder of FIG. 4 is very fast, but, like the adder of FIG. 3, uses many components. Again, faster carry logic requires a higher component density.

The truth table in FIG. 5 shows the logical relationships between two single bits that are being added, the carry-in bit, and the carry-out bit. A careful analysis of this truth table has revealed a useful pattern. When A and B are equal (lines 1, 2, 7, and 8), the value of the carry-out $C_{out}$ bit is the value of A and of B. When A and B are not equal, on the other hand, (lines 3-6), the value of the carry-out $C_{out}$ bit is the value of the carry-in $C_{in}$ bit. Two equivalent Boolean logic equations can represent this pattern:

$$C_{out} = (A \oplus B) \cdot (C_{in}) + (A.\text{fourthroot}.B) \cdot A \quad (10)$$

$$C_{out} = (A \oplus B) \cdot (C_{in}) + (A.\text{fourthroot}.B) \cdot A \quad (11)$$

The circuit in FIG. 6a implements equation (10). This circuit satisfies two conditions. When A and B are not equal, the signal on the carry-in terminal is passed to the carry-out terminal and when A and B are equal, the signal on A is passed to the carry-out terminal. As shown in FIG. 6a, the two single bits being added, A and B, are applied to the two input terminals of XOR gate 51. If A and B are equal, a low output signal from XOR gate 51 turns on pass transistor T1 and turns off pass transistor T2, allowing passage of the signal from A to the carry-out terminal $C_{out}$. If A and B are not equal, the output of XOR gate 51 is high, which turns on pass transistor T2 and turns off pass transistor T1. This in turn allows passage of the signal on the carry-in terminal $C_{in}$ to the carry-out terminal $C_{out}$.

FIG. 7a shows a full adder. FIGS. 6b and 7b show alternative representations of the circuits of FIGS. 6a and 7a respectively. The inverter and transistors of FIGS. 6a and 7a are represented as a multiplexer M in the illustrations of FIGS. 6b and 7b.

FIG. 8a illustrates a prior art circuit for implementing carry logic in a configurable logic block. The carry path is implemented by hardware in order to achieve high speed, comprising MUX 913 in FIG. 8a. The data modification function 911 and XOR gate 912 for receiving input signals are also implemented in dedicated hardware while additional data modification functions 914 and 917 and XOR gates 915 and 916 used for computing the sum are implemented in programmable function generator 902.

FIG. 9a illustrates a 16-bit look-up table capable of producing an output signal in response to any one of sixteen possible combinations of four input signals. Thus input signals A and B control the X decoder to select any one of the four columns in the 16-bit look-up table. Input signals C and D control the Y decoder to select any one of the four rows in the 16-bit look-up table. The 16-bit look-up table produces an output signal representative of the bit at the intersection of the selected row and column. There are 16 such intersections and thus sixteen such bits. There are $2^{16}$ possible combinations of functions capable of being represented by 16 bits. Thus, if a NOR gate is to be simulated by the 16 bits in the look-up table, the Karnaugh map for the look-up table would be as shown in FIG. 9c.

In FIG. 9c, all bits are "0" except the bit at the intersection of the first row (representing A=0, B=0) and the first column (representing C=0, D=0). Should a less frequently used function be desired to be generated by the 16-bit look-up table, (for example, should a "1" output signal be desired for A=1, B=0, C=0, D=0) then a binary "1" is stored at the intersection of the second row and the first column. Should a binary "1" be desired both when A=0, B=0, C=0, and D=0 and also when A=1, B=0, C=0 and D=0 then a binary "1" is stored at each of the intersections of the first column with the first row and the second row. The logic circuit represented by this loading of the look-up table is as shown in FIG. 9d. Thus the look-up table of FIG. 9a represents an elegant and simple implementation of any one of $2^{16}$ logic functions.

FIG. 9b shows another structure for yielding any one of sixteen select bits. Each of registers 0-15 in the vertical column to the left labelled "16 Select Bits" contains a selected signal, either a binary 1 or 0. By selecting the proper combination of signals A, B, C, and D and their complements, a particular bit stored in a particular one of the sixteen locations in the 16 Select Bits register is transmitted to the output lead. Thus, for example, to transmit the bit in the "1" register to the output lead, the signal A, B, C, D is applied to the leads so labelled. To transmit the signal labelled "15" in the sixteenth location in the 16 Select Bits register to the output lead, the signal A, B, C, D is applied to the appropriate columns. Again, any one of $2^{16}$ logic functions can be implemented using this structure.

FIGS. 10, 11a, 11b, and 11c show circuit diagrams used in the Xilinx XC4000 family devices for implementing the structure of FIG. 8a.

In FIG. 10, the fast carry logic is incorporated in a circuit containing look-up table function generators, multiplexers, memory cells and extra logic gates that are used in configuring the circuit for multiple uses. Operation of the look-up table function generators will be described in connection with FIGS. 9a-9d.

Input terminals F1 and F2 provide input signals $A_0$ and $B_0$ respectively. Function generator F, XNOR gate X101, memory cells CL0, CL1, multiplexer M2, and a third input terminal F3, work in conjunction to allow the same circuit to function selectively as an adder or as a subtractor. A device in which a storage cell (not shown) receives an output signal $S_0$ from function generator F allows the circuit to function as an accumulator or counter as well. One input of the XNOR gate X101 is the output of M2, and the other input is the output of NOR gate N201. The two inputs to the NOR gate N201 are the complement of the signal on input terminal F2 and the complement of the value in CL7. For the circuit to function as a middle stage in a multi-bit adder, CL7 is set to input a low signal to NOR gate N201. This results in the output of NOR gate N201 being the signal on input terminal F2.

To control whether the circuit functions in the increment mode or the decrement mode, multiplexer M2 determines whether the signal provided by NOR gate N201 will or will not be inverted by XNOR gate X101. The value provided by M2 is provided by F3 or CL1 as controlled by CL0. CL1 is typically used to provide a static value while F3 provides a dynamically changing signal.

When M2 causes the circuit to function in the increment mode, the signal $B_0$ is propagated through XNOR gate X101 to XNOR gate X103. The truth-table of an XNOR gate shows that an input signal on one terminal of an XNOR gate is passed to the output of the XNOR gate when the signal on the other input terminal is high. Therefore, when the output of M2 is high, the carry-logic functions in the increment mode. When the output of M2 is low, however, signal $B_0$ is inverted by XNOR gate X101, and the carry logic of the circuit functions in the decrement mode. Further, if the control signal for selecting the increment/decrement mode originates on the F3 terminal, then this signal will also be applied to function generator F so that the sum logic implemented in function generator F will accordingly also function in either the increment or decrement mode.

First consider that the circuit is being used as an adder or incrementer and that multiplexer M2 is providing a high signal, so that the input $B_0$ is passed to the input of XNOR gate X103.

A second group of memory cells, CL2-CL5 and CL7, work together to allow the circuit of FIG. 10 to perform several functions. For the circuit to operate as a middle stage in a multi-bit adder, memory cells CL3, CL4 and CL5 are set high. Thus the combination X103 and I104 acts as an XOR gate (equivalent to XOR gate 91 in FIG. 7a) so that the output of XNOR gate X103 will pass through inverter I104. Setting memory cell CL4 high places the signal from terminal F1 onto line 105. In this configuration the F-stage of FIG. 10 is equivalent to the carry circuit of FIGS. 6a and 7a. The signal from F1 is propagated to $C_1$ if transistor T102 (equivalent to transistor 93 of FIG. 7a) turns on in response to $A_0$ being equal to $B_0$. Setting memory cell CL5 high prevents the value in cell CL7 from simultaneously being propagated to line 105.

Setting memory cell CL3 low causes transistors T101 and T102 to be controlled by the signal in memory cell CL2. If CL2 is high, transistor T101 turns on, causing $C_0$ to be propagated to $C_1$. This configuration of memory cells CL2 and CL3 allows the carry signal $C_0$ to skip the carry logic of the F-stage. Skipping the carry logic of a particular stage in this way can be useful if layout constraints require a particular stage in a logic block to be used for something other than a stage in the adder (or counter, etc.).

If memory cell CL2 is set low (while CL3 is still low), T101 turns off and T102 turns on. When T102 is on, the signal on line 105 will be propagated to $C_0$. The signal on line 105 is controlled by memory cells CL4, CL5, and CL7, which together with inverters I105 and I106 make up 3:1 multiplexer M101. Multiplexer M101 controls which of 3 signals, the signal on terminal F1, the complement of the signal on terminal F3 (F3), or the signal in memory cell CL7, will be placed on line 105. Note that the signal on F3 may be used by multiplexer M2 or by multiplexer M101.

As noted earlier, when the F-stage operates as a middle stage in a multi-bit adder, memory cells are programmed so that the signal on terminal F1 is placed on line 105. In addition CL3 is set high so that the value provided by XNOR gate X103, which is set to be a function of the $A_0$ and $B_0$ inputs on lines F1 and F2, will determine whether the carrying signal $C_0$ or the value on F1 is propagated.

For the F-stage to add the least significant bit in a multi-bit adder, the carry-in can be preset to zero by applying a logic zero to one of Carry-InT or Carry-InB and setting memory cell MC to propagate the signal. (Generating this logic zero signal is discussed below in conjunction with FIG. 11a.).

Alternatively, to preset the carry-in signal $C_0$ of the G-stage, any of the signal on F3, the signal in CL7 or the signal on F1 can be used. The signal F3 is selected to be placed on line 105 by setting CL5 high and CL4 low, and the signal in CL7 is selected by setting both CL4 and CL5 low. The F1 input terminal can also be used to preset the $C_1$ signal when the lowest order bit will be calculated in the G-stage. F1 can be used when the F1 input to the F function generator is not needed. To use F1 as the input for presetting $C_1$, high signals are stored in memory cells CL4 and CL5. Additionally, CL3 is set low and CL2 is set low, turning off transistor T101 and turning on transistor T102 so that the signal on line 105 will propagate to $C_1$.

In addition to functioning as a part of the 3:1 multiplexer M101, memory cell CL7 controls one input to NOR gates N201 and N202. For the F-stage to function as a middle stage in a multi-bit adder for adding values $A_0$ and $B_0$ on terminals F1 and F2, CL7 is set high so that the output of N201 is the signal on the input terminal F2. To add a constant to the input value $A_0$ on F1, CL7 is set low. This forces the input of N201 high, which forces the output of N201 low, and causes the addend to be selected by multiplexer M2. Memory cell CL0 can cause M2 to select between applying the value in CL1 and the value of F3 to XNOR gate X101 for generating an output to be added by X103 to $A_0$ on terminal F1. Thus, by programming CL7 low, a bit can be programmed to a constant value to be added to an input value without having to use the interconnect resources to which terminal F2 would be connected, which may be needed for carrying signals to other logic blocks (not shown).

Not all combinations of logic values in the memory cells of FIG. 10 are acceptable. For example, within M101, contention is possible if memory cell CL4 is high and memory cell CL5 is low, since both high and low signals could be simultaneously placed on line 105. To prevent such contention, software for programming the memory cells may be programmed to prevent this combination. Alternatively, an extra memory cell may be added to select only one of the two signals to be placed on line 105.

As discussed above, two stages, F-stage and G-stage, each representing one bit of a multi-bit adder, are cascaded together as in FIG. 10. Thus a single logic block can implement two bits in a multi-bit function that uses carry logic. This is a distinct improvement in the density of components required to implement functions that use carry logic compared to the earlier Xilinx devices.

Regarding the G-stage of FIG. 10, a multiplexer M3 in the G-stage receives the carry-out signal of the F-stage, $C_1$, after it is buffered through two inverters I107 and I108. In an adder, carry-out signal $C_1$ will be combined in the G-function generator with the addends $A_1$ and $B_1$, present on terminals G4 and G1 respectively, to compute the sum bit $S_1$. Carry-out signal $C_1$ of the F-stage is also available to be propagated by transistor T103 to the carry-out $C_{i+2}$ of the G-stage, depending on the configuration conditions of the carry-logic of the G-stage.

Much of the carry-logic of the G-stage is identical to the carry-logic of the F-stage. For example, XNOR gate X102 of the G-stage functions analogously to XNOR gate X101 of the F-stage and is controlled by the output of the same multiplexer M2 to determine whether the G-stage will function as an adder or incrementer on the one hand, or a subtractor or decrementer on the other hand. Additionally, NOR gate N202 of the G-stage functions as NOR gate N201 of the F-stage, where one input is controlled by the memory cell CL7 to allow forcing the addend of the G stage to a constant value without having to use the interconnect resources coupled to the input terminals of the G-stage.

However, instead of memory cells CL2 and CL3 in the F-stage, the G-stage has only one memory cell CL6. CL6 functions similarly to CL3, controlling whether the G-stage functions as a mid-stage in a multi-bit adder or whether the carry signal will bypass the carry logic of the G-stage. When CL6 is high, transistor T105 turns on, and the G-stage functions as a middle stage in a multi-bit adder. When CL6 is low, thereby causing a low signal to be applied through transistor T106 to inverter I110, T103 is on (and T104 off). Turning on transistor T103 allows the carry signal at $C_1$ to bypass the carry logic of the G-stage. As with the F-stage, bypassing the G-stage, or any other particular stage in a logic block, might be required by a design layout, which uses the G-stage for a different function.

Multiplexers M3 and M4 in the G-stage are connected and used differently from the multiplexers M1 and M2 of the F-stage. Multiplexer M2 of the F-stage controls whether the carry logic of the G-stage as well as the carry logic of the F-stage will function in an increment-mode or a decrement-mode. However, the G-stage does have its own multiplexer M4 which controls whether the sum logic in the function generator G will perform in the increment-mode or the decrement-mode. M4 is wired to control the sum logic in this way because one of its inputs, G3, is coupled to the same interconnect circuitry (not shown) as is the corresponding input F3 which controls the increment/decrement-mode of the F-function generator.

The other inputs of the multiplexers M3 and M4 of the G-stage are distributed so that signals needed simultaneously are not input into the same multiplexer. To operate as a middle stage in a multi-bit adder, the G-function generator needs both a signal controlling whether it operates in the increment or decrement mode, and a carry-out signal from the less significant bit. Thus, the increment/decrement mode signal applied to F3 is also applied through G3 to multiplexer M4 and the carry out signal from the less significant bit is routed to the multiplexer M3, making both signals available simultaneously to the G-function generator.

Further, in order to detect an overflow, as will be discussed below, the signals $C_1$ and $C_0$ must be compared and so must be available simultaneously. Thus the signal $C_1$ is input to multiplexer M3 and the signal $C_0$ is input to the other multiplexer M4, so that both can be available together to be input to the G-function generator.

The circuit of FIG. 10, comprising two stages cascaded together has the further ability to detect in the G-stage an overflow in processing the most significant bit, performed in a previous block. It is well known in the art to detect an overflow by recognizing that the carry of the sign bit is different from the carry of the most significant bit. Detecting an overflow condition can thus be accomplished by computing the XOR function of the carry of the sign bit and the carry of the most significant bit. In the circuit shown in FIG. 10, the carry of the most significant bit is presented at $C_0$, the carry-in to the F-stage, and the carry of the sign bit (which is a function of the $A_0$ and $B_0$ signals to the F-stage and the $C_0$ signal, is presented to $C_1$, the carry-out of the F-stage. $C_0$ is routed through I120 and I121 to the multiplexer M4 in the G-stage. $C_1$ is routed through I107 and I108 to the multiplexer M3 in the G-stage. To configure the circuit of FIG. 10 to detect an overflow, M3 is programmed to route $C_1$ to the G-function generator, and M4 is programmed to route $C_0$ to the G-function generator. The G function generator is programmed to compute the XOR function of $C_1$ and $C_0$, which, as discussed above, is an overflow, detect signal.

The circuit of FIG. 10 can also function in the decrement mode. In the decrement mode, the circuit can decrement a counter or perform subtraction, including subtracting a constant from a variable.

Several modes for performing subtraction can be used with the circuit of FIG. 10. Three common modes for subtraction are two's complement, one's complement and sign-magnitude.

When the two's complement mode of subtraction is to be used, the carry-in bit of the least significant bit is preset to logic one. If the least significant bit is to be provided by the F-stage, the carry in of the least significant bit is preset through carry $In_T$ or Carry $In_B$ and memory cell MC is set to propagate the signal to $C_0$. To apply a preset signal to Carry $In_B$ or Carry $In_T$ of the F-stage, the preset signal is generated in the F-stage of another logic block, and connected to the F-stage of the least significant bit. The signal may be generated in the F-stage as discussed above and passed through the G-stage to the next logic block by turning on transistor T103 and turning off transistor T104. Thus the carry logic in the G-stage of that logic block used to generate a preset signal is bypassed.

Alternatively, if the least significant bit is to be provided by the G-stage in a two's complement subtraction, then transistor T101 is turned off and transistor T102 is turned on (by setting CL3 low and CL2 low) so that one of the three inputs of multiplexer M101 can be used to preset $C_1$ to logic one. Multiplexer M101 can provide the logic one through the F3 terminal by applying a low signal to F3, and setting CL5 high and CL4 low. Multiplexer M101 can provide the logic one as a stored value in memory cell CL7 by setting CL7 high, CL5 low, and CL4 low. Multiplexer M101 can provide the logic one through the F1 input terminal by applying a high signal on F1, and setting CL5 and CL4 high.

When performing one's complement subtraction or sign-magnitude subtraction, the carry-in of the least significant bit is usually preset to logic zero. In the case of one's complement subtraction the carry out of the sign bit must be added to the least significant bit to generate the final answer. This may be accomplished by connecting the carry out terminal of the sign bit to the carry in terminal of the least significant bit rather than presetting the carry in of the least significant bit. Alternatively, the carry out of the sign bit is added to the generated sum. When the least significant bit is to be calculated in the F-stage, carry-in $C_0$ is preset to zero by applying a logic zero to Carry $In_T$ or Carry $In_B$ and setting memory cell MC to propagate the signal to $C_0$. When the least significant bit is to be calculated in the G-stage, carry-in $C_1$ is preset to zero through one of the three paths in multiplexer M101 as discussed above. For providing the logic zero through the F3 terminal, a high signal is applied to F3 (since it will be inverted). For providing the logic signal through CL7, the logic zero is loaded into CL7. For providing the logic zero through F1, a low signal is applied to F1.

For both two's complement and one's complement subtraction, the output of multiplexer M2 must be set low. For sign-magnitude subtraction, the output of M2 depends upon whether the signs of the two numbers to be subtracted are the same. For sign-magnitude subtraction, the output of M2 is set low if the two numbers are of the same sign. The output of M2 is set high if the two numbers are of opposite signs.

A multi-bit adder, is described with reference to FIG. 11a. Here an ordered array of blocks 1-4, each block comprising a circuit as shown in FIG. 10, is provided such that the carry-out, labelled $C_{i+2}$ in FIG. 10 and labelled Carry Out on each logic block in FIG. 11a is connected both to the carry-in of the logic block above, labelled Carry $In_B$ in both figures and the carry-in of the logic block below, labelled Carry $In_T$ in both figures. Further, each logic block can selectively receive a carry signal either from the logic block above (on terminal Carry $In_T$) or the logic block below (on terminal Carry $In_B$). Whether a logic block receives a carry signal from the logic block above or the logic block below is controlled by memory cell MC. If MC is high, transistor T152 is on, and the carry signal from the logic block below is received on the Carry $In_B$ terminal. If MC is low, transistor T151 is on, and the carry signal from the logic block above is received on the Carry $In_T$ terminal. For example, line L112 connects the carry-out terminal of block 2 to the carry-in terminal Carry $In_B$ of block 1 and to the carry-in terminal Carry $In_T$ of block 3. Similarly, line L113 connects the carry-out terminal of block 4 to the carry-in terminal Carry In$_B$ of block 3 and the carry-in terminal Carry In$_T$ of block 5 (not shown). Thus, block 3 receives a carry signal on Carry In$_B$ from block 4 on L113 and on Carry In$_T$ from block 2 on L112. How memory cell MC is programmed will determine which of transistors T151 and T152 will be on, and thus which of the carry signals will be used by the internal circuitry of logic block 3.

As shown in FIG. 10, two additional gate delays per two bits are added by inverters I101 and I102 in order to maintain signal quality on a long line (approximately four gate delays for four bits). By contrast, the output signal C$_{out}$ of four cascaded conventional ripple carry full-adders, such as shown in FIG. 2, is not available until one XOR gate, four AND gates and four OR gates are passed (nine gate delays). Furthermore, whereas look-ahead carry circuits such as shown in FIG. 3 achieve faster carry propagation only through a much higher density of components, the circuit of FIG. 10 requires no more components than a conventional ripple carry adder.

The primary benefit of dedicated carry interconnect circuitry is that it performs much faster than does programmable carry interconnect circuitry. This increased performance is traded for the flexibility of the programmable interconnects. However, the dedicated interconnect circuitry shown in FIG. 11a is flexible in that the carry signals can be propagated in either of two directions through the array.

FIG. 11b shows an interconnect structure which does not use dedicated interconnect circuitry for propagating signals in a choice of directions through an array. FIG. 11 shows only a partial set of memory cells and interconnects which would be needed in the interconnect structure for interconnecting logic blocks to form a multi-bit adder or other multi-bit function that uses carry logic. According to FIG. 11, output C$_0$ of logic block 11-2 can be connected to either logic block 11-1 or logic block 11-3 by turning on a corresponding transistor controlled by memory cell M11-2 which connects the output of logic block 11-2 to interconnect line 11-a. If it is desired to connect output C$_0$ of logic block 11-2 to input C$_{IB}$ of logic block 11-1, memory cell M11-1 is programmed to turn on its corresponding transistor so that the signal on line 11-a will propagate to terminal C$_{IB}$ of block 11-1. If it is desired to connect output C$_0$ to logic block 11-3, memory cell M11-3 is turned on to connect interconnect line 11-a to input C$_{IT}$ of logic block 11-3. Other memory cells (not shown) can likewise be programmed to control the direction of signal propagation from one logic block to the next. It is easy to see that a large number of memory cells is needed in order to provide flexibility in controlling the propagation direction of the carry signal through the stages of a multi-bit adder.

Another circuit shown in FIG. 11c exhibits more sophisticated dedicated carry interconnect circuitry. This dedicated interconnect circuitry allows a carry chain to be built in a serpentine fashion of arbitrary length. Some of the blocks are configured as in FIG. 11a, that is, such that the carry out signal is propagated to both the logic block above and the logic block below. However, at the top and bottom edges of the array, the circuits are configured differently. At the top edge, the carry out signal of a logic block is propagated to the carry-in of the logic block below, and to the carry-in of the logic block to the right. Further, each top logic block receives a carry-in signal from the logic block below and from the logic block to the left. Each circuit on the bottom is configured such that the carry out signal of a logic block is propagated to the carry-in of the logic block above, and to the carry-in of the logic block to the right. Further, each bottom logic block receives a carry-in signal from the logic block above and from the logic block to the left. Memory cell MC of each logic block controls which carry-in signal of the two available carry-in signals will be received by the logic block as discussed in connection with FIG. 11a.

The sophisticated dedicated interconnect circuitry shown in FIG. 11c is especially useful in providing increased flexibility in design layouts. Multi-bit adders or counters, or other multi-bit arithmetic functions, need not be restricted to a particular column of logic blocks. For example, an eight-bit counter can be implemented in the horseshoe configuration consisting of logic blocks B3, B4, A4, and A3, where A3 will contain the least significant bit and the next more significant bit, A4 the next two more significant bits, B4 the next, and finally, B3 the two most significant bits. The memory cells MC (FIG. 10) of each block will be programmed such that the carry signal will propagate from C$_0$ of logic block A3 to C$_{IT}$ of logic block A4, then from C$_0$ of logic block A4 to C$_{IB}$ of logic block B4, and finally from C$_0$ of logic block B4 to C$_{IB}$ of logic block B3. Since the internal circuitry of the logic blocks (as shown in FIG. 10) allows the carry logic of any particular bit(s) to be bypassed, the eight-bit counter (or other function using carry logic) need not be realized in adjacent blocks. So, for example, the least significant bits could be in logic block A2 instead of A3, with the other six bits being in A4, B4, B3 as in the previous example. By appropriately programming the memory cells CL2, and CL3 and CL6 in block A3, the carry signal C$_0$ of logic block A2 will bypass the carry logic of logic block A3, and propagate to C$_{IT}$ of logic block A4.

The basic requirement while designing for such an entity is to have minimal hardware overhead and fast carry propagation. Normally for sum and carry generation some gates like XOR and others, follow two input LUT to give the desired result. One such architecture exists as Virtex by Xilinx Inc. (U.S. Pat. No. 5,481,206). This architecture performs one bit arithmetic per LUT as follows:

FIG. 12a illustrates a configurable logic block CLB that implements the embodiment of FIG. 8b. Four function generators F, G, H, and J are included in logic block CLB. Function generators F, G, H, and J each comprise look-up tables as discussed above in connection with FIGS. 9a through 9d. Thus, each function generator provides any function of the input signals F0 through F3, G0 through G3, H0 through H3, and J0 through J3 respectively. To implement an arithmetic function of input variables A and B, one bit is handled in each of the function generators. For example, the lowest order sum bit S$_0$ may be calculated from the lowest order bits of A and B, namely bits A$_0$ and B$_0$, in the F function generator. Bit A$_0$ is provided to both the FB input terminal and to an input terminal F0, F1, F2, or F3 of the F function generator. Bit B$_0$ is provided to another terminal of the F function generator or generated within the function generator as a function of the other inputs. For performing addition, a logical 0 is provided on carry-in line CIN. Likewise, bits A$_1$ and B$_1$ are provided to the G function generator, and so forth for the higher order bits. The function generators are each programmed by loading the appropriate lookup table to generate the XOR function of the A and B bits as indicated by unit 903 of FIG. 8b. (As shown in FIG. 8b, the B input value may be generated internally to the function generator as a function of other inputs on lines not used for the A input. This is possible because the function generator may provide any function of four inputs.) Thus the function generators implement any data modification 921 and each generate XOR function 922 of the corresponding bits A$_i$ and B$_i$. This embodiment does not limit arithmetic operations to four-bit numbers because the CLB is formed as part of an array of CLBs, and higher order bits may be handled in CLBs connected above the CLB shown.

Associated with the function generators are fast carry MUXes C1, C2, C3, and C4. MUX C1 receives a carry-in signal CIN (which will be 0 if the arithmetic is addition and the F function generator is receiving the lowest order bits) and a B input signal FB, and generates an output signal C1OUT. MUX C2 receives the C1OUT signal and a second B input signal GB, and generates an output signal C2OUT. MUXes C3 and C4 are connected equivalently. MUX C4 generates the COUT signal from the logic block CLB. Function generators F, G, H, and J provide as output signals X, Y, Z, and V respectively, the respective carry-propagate signal $P_i$. These output signals control carry MUXes C1, C2, C3, and C4 as discussed in connection with FIG. 6a, and thus provide a cumulative carry out function COUT.

It is necessary to provide periodic repowering of the carry signal, as was discussed in connection with inverters I101 and I102 of FIG. 10. The frequency with which repowering buffers are provided depends upon the interconnect architecture in which the circuit will be used. As shown in FIG. 12a, a repowering buffer comprising inverters I121 and I122 is positioned every four multiplexers in the carry path, or once every CLB. In another embodiment, repowering buffers are provided every two multiplexers in the carry path, thus two repowering buffers are provided in every CLB.

The embodiment of FIG. 12a uses another CLB identical to the one shown but positioned adjacent, preferably to the right or left of that shown, to generate the sum $S_i$ of FIG. 8b. To provide the carry-propagate signal $P_i$ to the sum CLB to its left or right, MUXes B1, B2, B3, and B4 are set by their respective memory cells 1 and 5 to forward the outputs of carry MUXes C1, C2, C3, and C4. Memory cells 3 and 7 are likewise set to cause MUXes S3 and S1 to forward the outputs of MUXes B3 and B1. Thus the outputs of carry MUXes C1, C2, C3, and C4 appear at output lines XB, YB, ZB, and VB. In the sum CLB to the right or left of the carry CLB, output XB is connected to line FB and one of inputs F0 through F3. Output X is connected to another of inputs F0 through F3. Equivalent connections are made to the G, H, and J function generators. In the sum CLB, function generators F, G, H, and J then provide the sum outputs for successive bits.

FIG. 12b shows another embodiment of the above circuit, which requires only a single function generator per bit. The CLB of FIG. 12b is similar to that of FIG. 12a, but includes XOR gates S1 through S4 for calculating the sum.

In the embodiment of FIG. 12a, a single memory cell 1 controls both of Muxes B3 and B4, while in the embodiment of FIG. 12b, MUX B4 is controlled by memory cell 9 and MUX B3 is a three-input MUX controlled by memory cells 6 and 7. And, as discussed, in the embodiment of FIG. 12a the carry and sum of one bit are calculated in two different CLBs while in the embodiment of FIG. 12b, XOR gates S1 through S4 allow both the carry and the sum to be calculated in a single CLB. Thus the embodiment of FIG. 12b is more efficient for implementing arithmetic functions and the embodiment of FIG. 12a has higher density and therefore lower cost per CLB.

Note that in the embodiments of FIGS. 12a and 12b, there is no need for the multiplexers M1, M3, and M4 of FIG. 10, or for the related configuration memory cells for configuring multiplexers M1, M3, and M4. Note also that in contrast to FIG. 10, the function generator inputs, for example F0 through F3 are fully swappable. An input signal may be directed to any selected one of these inputs. This interchangeability may be an advantage when routing the signals through the interconnect structure. Note also, that in FIGS. 12a and 12b, any data modifying logic (see data modification unit 921 in FIG. 8b) is completely user-selectable, and is not restricted by having to place arithmetic inputs onto particular pins. Thus, the software, which routes the user's design, finds a route more easily, and the route typically requires a shorter path. Further, in comparing the invention as illustrated in FIG. 8b to the device of FIG. 8a, the device of FIG. 8a requires that the $A_i$, $B_i$, and $C_i$ inputs be provided to the function generator 902, thus limiting the number of additional inputs to one. By contrast, the embodiment of FIG. 8b can accommodate in data modification function 921 any function of three variables. If the sum $S_i$ is calculated in another function generator 904, that function generator may modify the $S_i$ function in data modification area 927 by any function of two additional inputs.

Although the circuit is efficient but to calculate sum of one bit it utilizes 4-bit input LUT along with dedicated carry chain. Accordingly, the size of LUT needs to be chosen appropriately as four input LUTs available would be much larger than desired resulting in wastage of resources. For example, to perform one bit full addition two LUTs are used. U.S. Publication No. 2002/116426 discloses a lookup table apparatus to perform two-bit arithmetic operation including carry generation.

Normally, fast carry chains are provided in FPGA architectures for fast adder implementations. The key is to provide a fast and efficient carry output. FPGA architectures are also required to implement various other macros within as fewer resources as possible. While utilizing the carry output that can to some extent do the same, it increases the amount of logic encountered to generate, slowing the carry output.

Here is proposed a unique logic entity, which simultaneously generates two outputs. The entity enables us to implement many macros, especially adder/subtractor in a fast and area efficient manner. Many more macros can also be implemented as well, as described. While a minimal hardware overhead exists inside the logic block, the external hardware saved from the macro implementation view outscores the same.

SUMMARY OF THE INVENTION

To address the above-discussed deficiencies of the prior art, the present invention provides a lookup table apparatus with two outputs for efficient adder and other macro implementations.

The object of this invention is to generate a simultaneous carry and sum for adder implementation.

Another object of this invention is to provide a fast and area efficient configuration.

Yet another object of this invention is to perform many more functionalities, which are FPGA specific.

To achieve these objectives, the present invention provides an improved logic entity with two outputs for efficient adder and other macro implementations, comprising:

a first lookup table for generating a first output for the carry out value for a carry-in of zero and a second output for the sum value for a carry-in of one;

a second lookup table for generating a first output for the carry out value for a carry-in of one and a second output for the sum value for a carry-in of zero;

a first multiplexer receiving a first input from the first output of the first lookup table and a second input from the first output of the second lookup table;

a second multiplexer receiving a first input from the second output of the first lookup table and a second input from the second output of the second lookup table;

thereby, getting two output taps for sum and carry implementation.

The said first and second lookup table comprises of:
a plurality of inverters for application of inputs;
a first and a second SRAM cell connected in series with each said inverter;
plurality of output inverters connected to the output of each of said second SRAM cells;
The said first output inverter receives input from first four said second SRAM cells.
The said second output inverter receives input from first three and fifth said second SRAM cells.
The said first multiplexer comprises:
a first AND gate with a configuration bit as the first input and carry-in as the second input;
a second AND gate with first output of first lookup table as its first input and carry-in as the second input;
a third AND gate with first output of the second lookup table as its first input and carry-in as the second input;
an OR gate with the outputs of said second and third AND gate as its inputs, and
a fourth AND gate with output of said OR gate and said first AND gate as its inputs,
thereby generating the required carry bit depending upon carry-in.
The said second multiplexer is a conventional multiplexer.
An XOR gate is connected to one of the inputs of said first and said second lookup table to perform addition/subtraction operation.

Said macro implementations include encoders, decoders, adders, subtractors, product term generators and multipliers.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "apparatus" may be used interchangeably and mean any device, system or part thereof that controls at least one operation. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The invention will now be described with reference to the accompanying drawings, in which like reference numerals represent like parts, and in which:

FIG. 1b is a schematic symbol for the conventional full-adder stage shown in FIG. 1a;

FIG. 5 is a truth table for displaying the relationship between the variables A, B, $C_{in}$ and $C_{out}$;

FIG. 6a is a schematic diagram of a circuit providing one bit of carry logic;

FIG. 6b shows an alternative representation of the circuit of FIG. 6a;

FIG. 7b shows an alternative representation of the circuit of FIG. 7a;

FIG. 9a shows a lookup table embodiment of the F and G function generators;

FIG. 9b shows another lookup table embodiment of the F and G function generators;

FIG. 9c shows a Karnaugh map for the look-up table for function generator of FIG. 9a or 9b;

FIG. 9d shows one of the $2^{16}$ logic functions that can be implemented by the lookup table function generator of FIG. 9a or 9b;

FIG. 10 shows a schematic diagram of a logic block having two stages, used in Xilinx, Inc XC 4000 family of devices, which includes the circuit of FIG. 8a;

FIG. 15 shows one embodiment of the invention for implementation of a half adder cum product term generator used in multiplier implementation;

FIG. 15a shows the truth table of a half-adder;

FIG. 15b shows the modified diagram of the multiplexer $M_x$ as used in the invention;

FIG. 20 shows 4:2 encoder implementation using circuit of the instant invention;

FIGS. 21(a) and 21(b) shows 2:4 decoder implementation using circuit of the instant invention; and FIGS. 22(a) and 22(b) shows product term generation using circuit of the instant invention.

DETAILED DESCRIPTION OF THE INVENTION

FIGS. 13a through 22b, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged improved logic entity for efficient adders.

The present invention performs two-bit arithmetic with a faster carry generation with minimum overhead. The proposed logic entity exploits the similarity between the Shannon decomposition of sum and carry logic with respect to carry in terms of the two inputs.

Figure 1A:
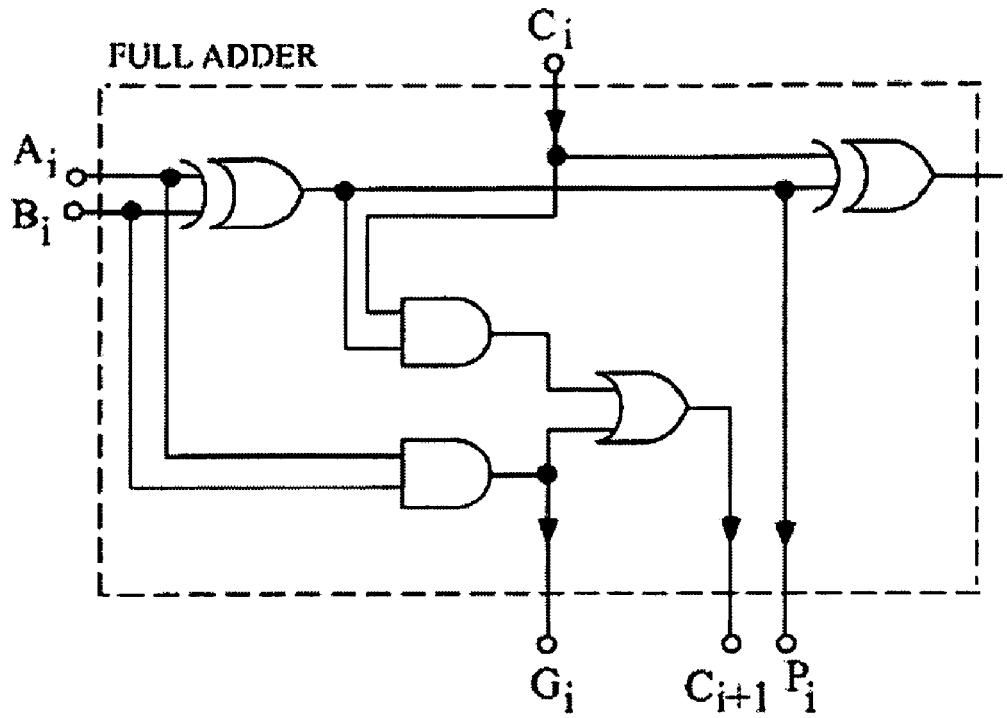
FIG. 1a is a schematic diagram showing one stage of a conventional full-adder.
Figure 1B:
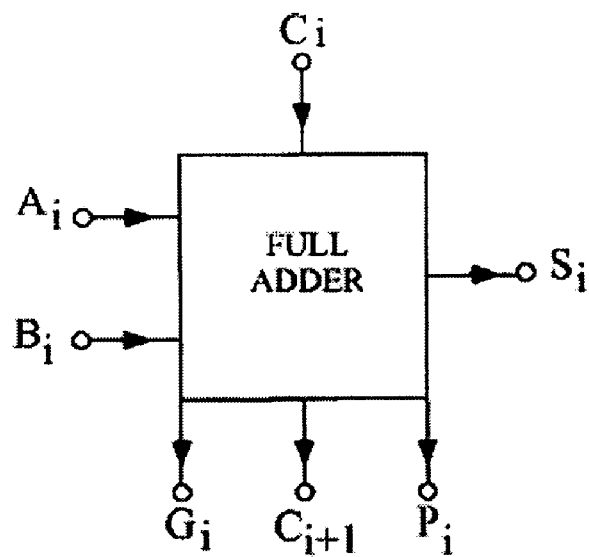
Figure 2:
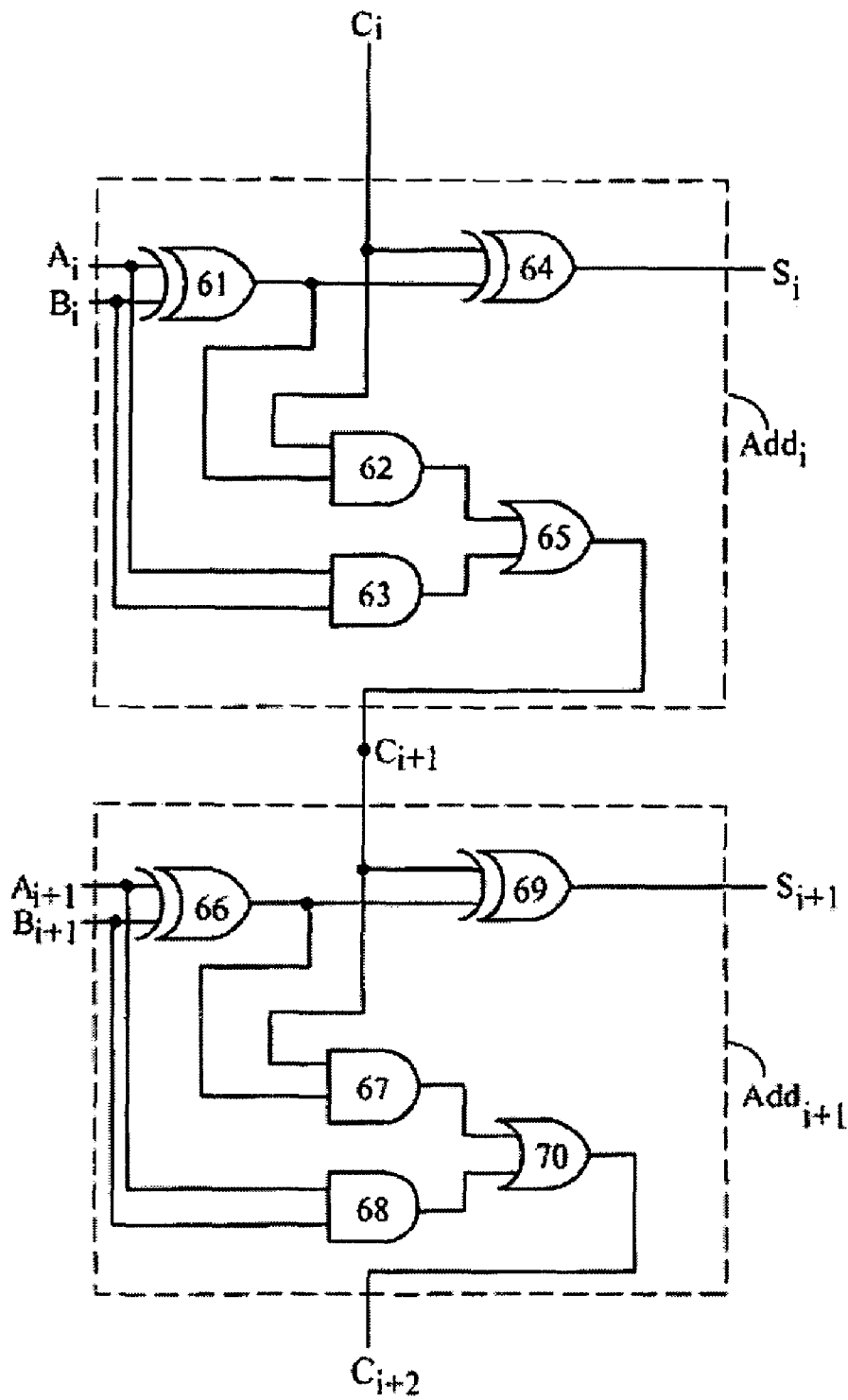
FIG. 2 is a schematic diagram of two full-adders cascaded together.
Figure 3:
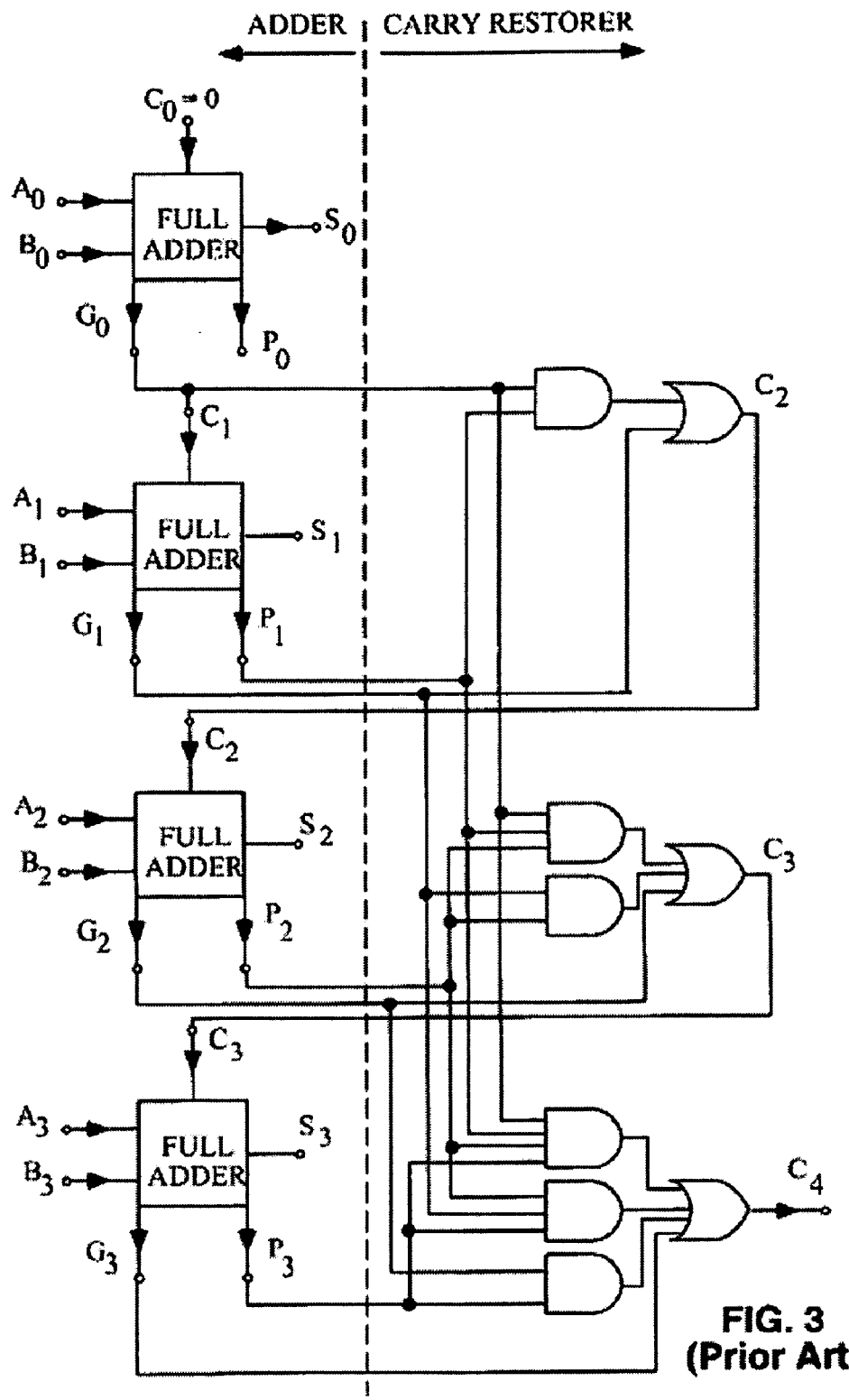
FIG. 3 is a schematic diagram of a four-bit adder with look-ahead carry logic.
Figure 4A:
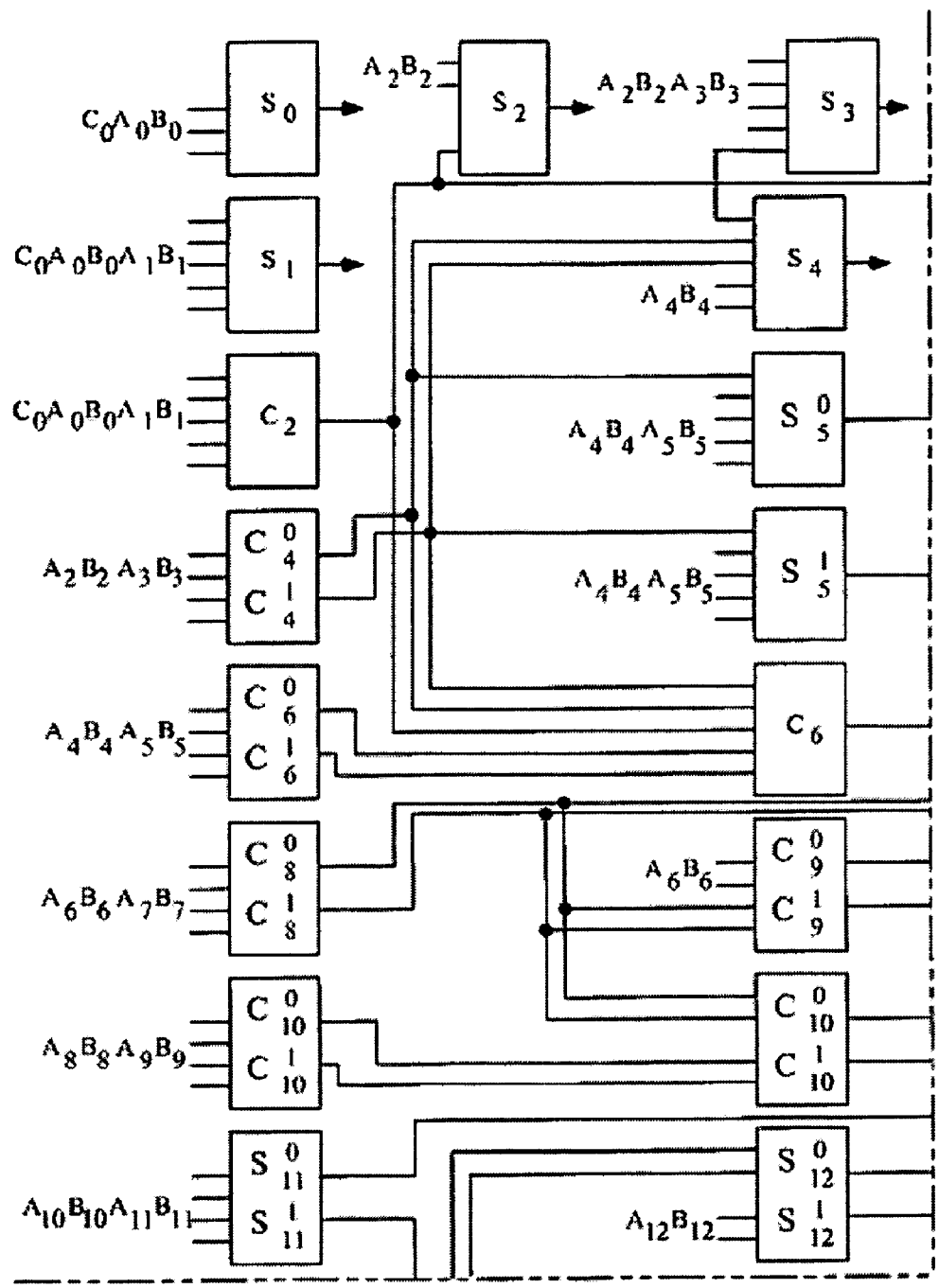
FIG. 4 is a schematic diagram of a prior art adder.
Figure 4B:
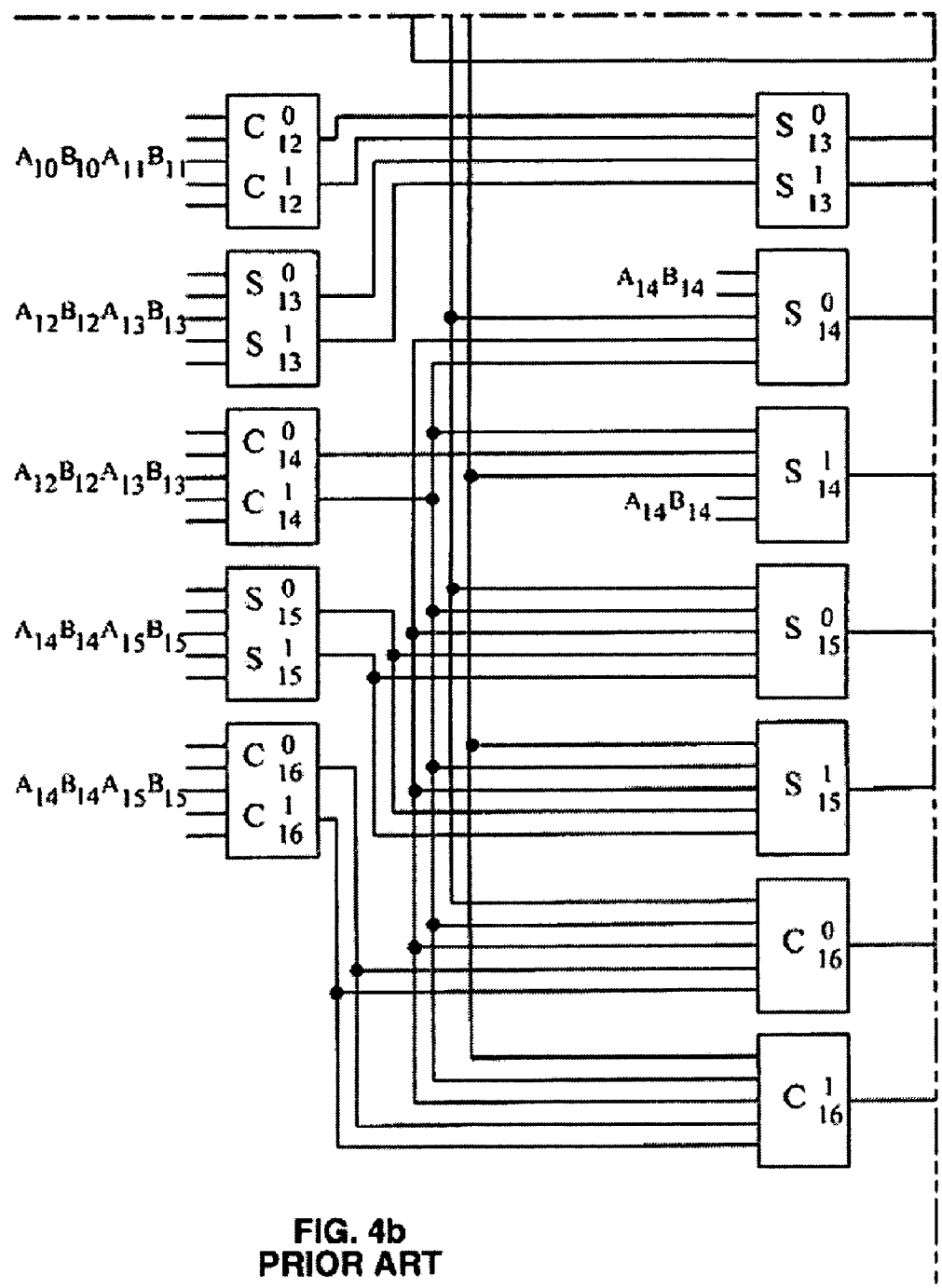
Figure 4C:
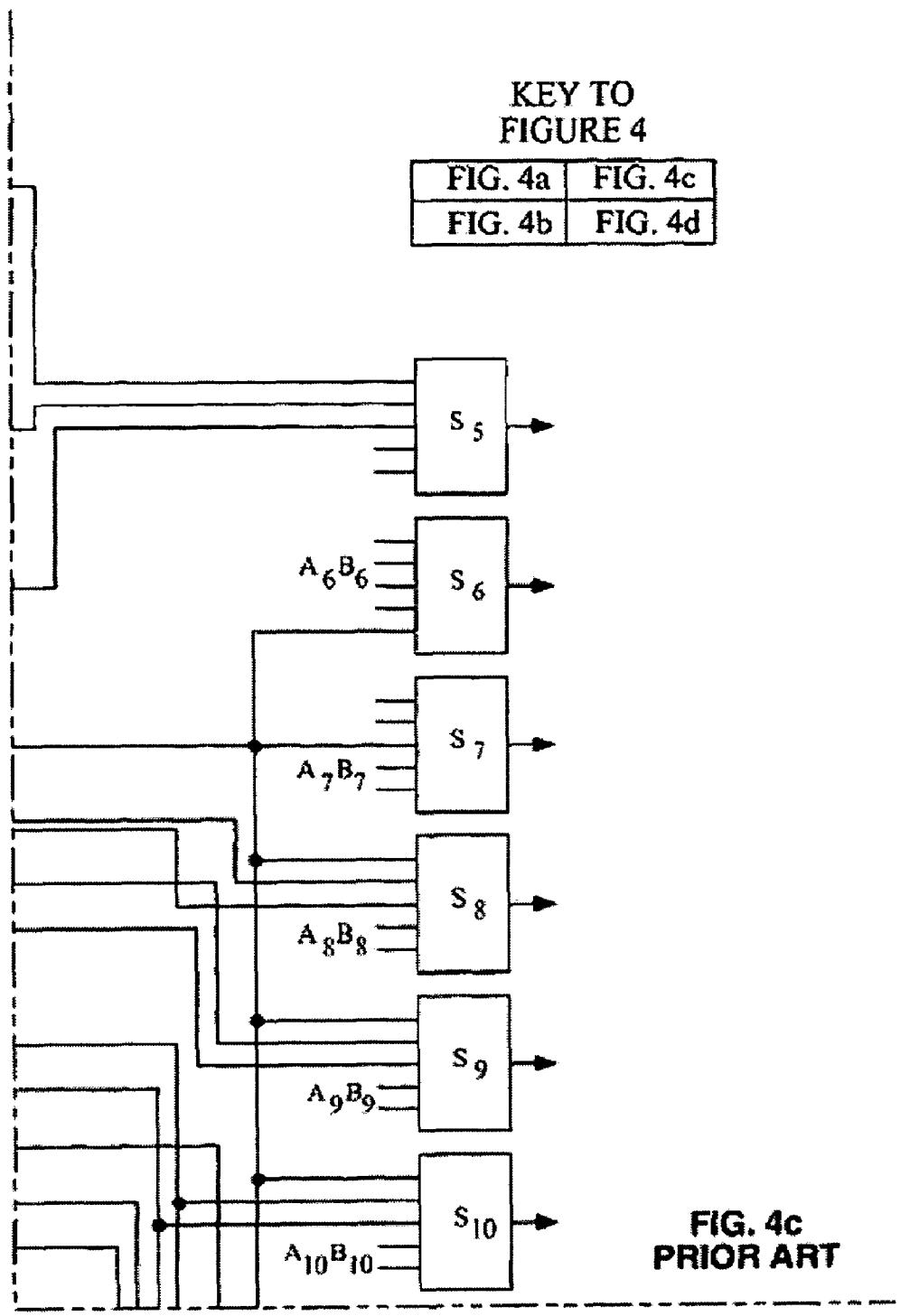
Figure 4D:
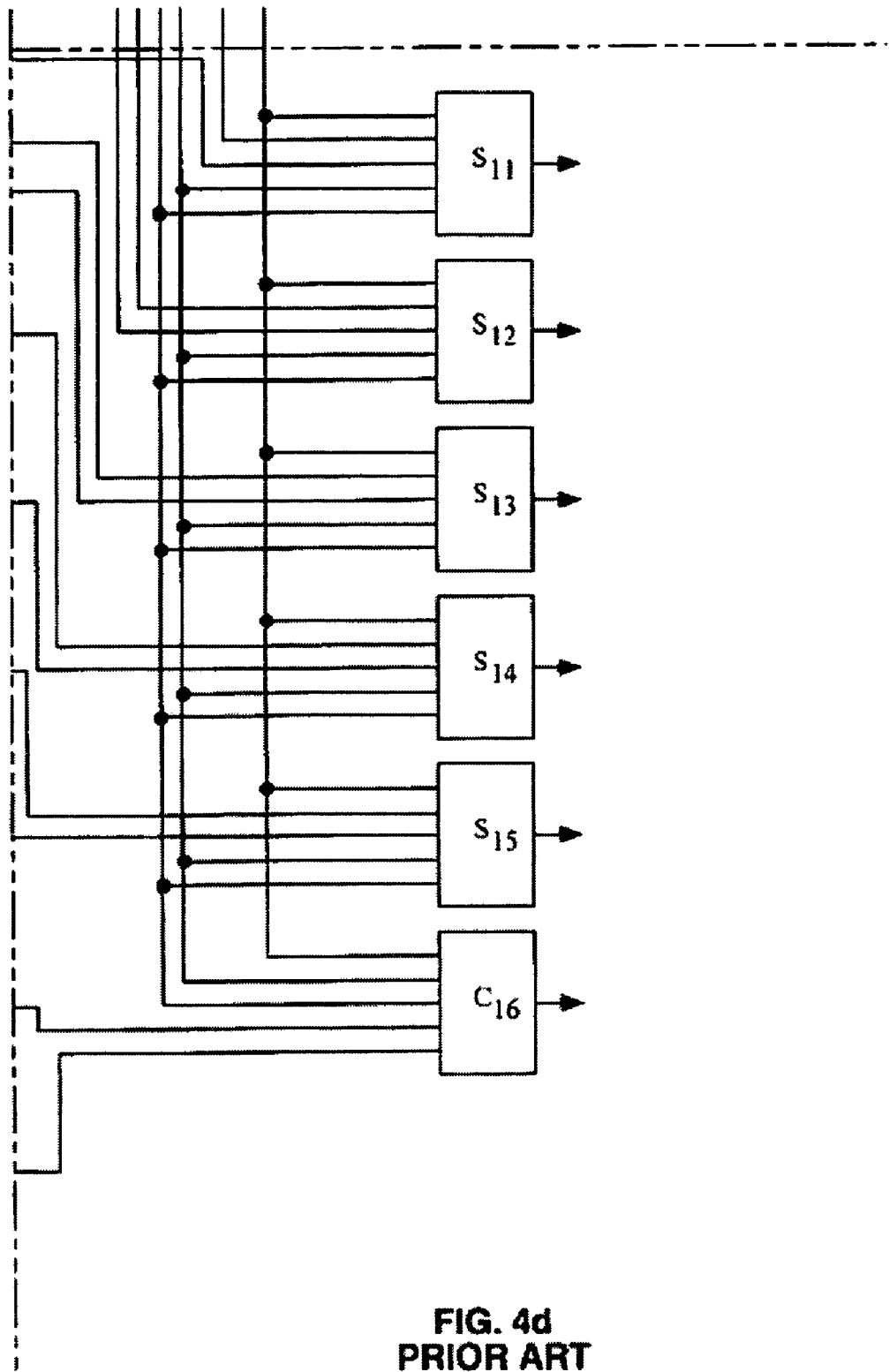
Figures 5, 6A, 6B:
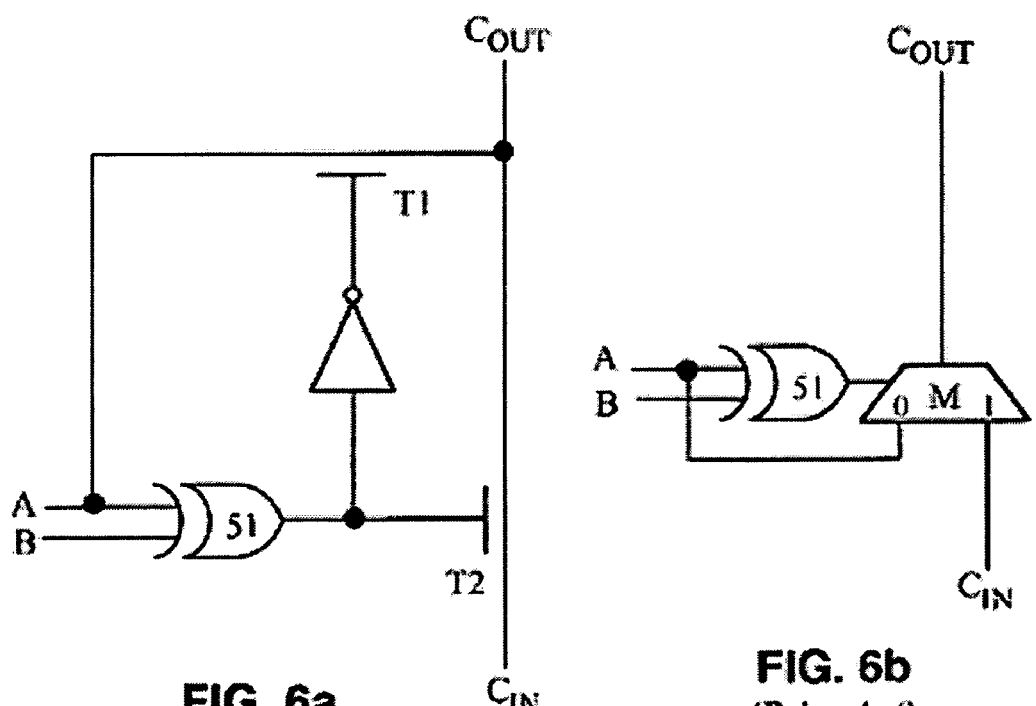
Figure 7A:
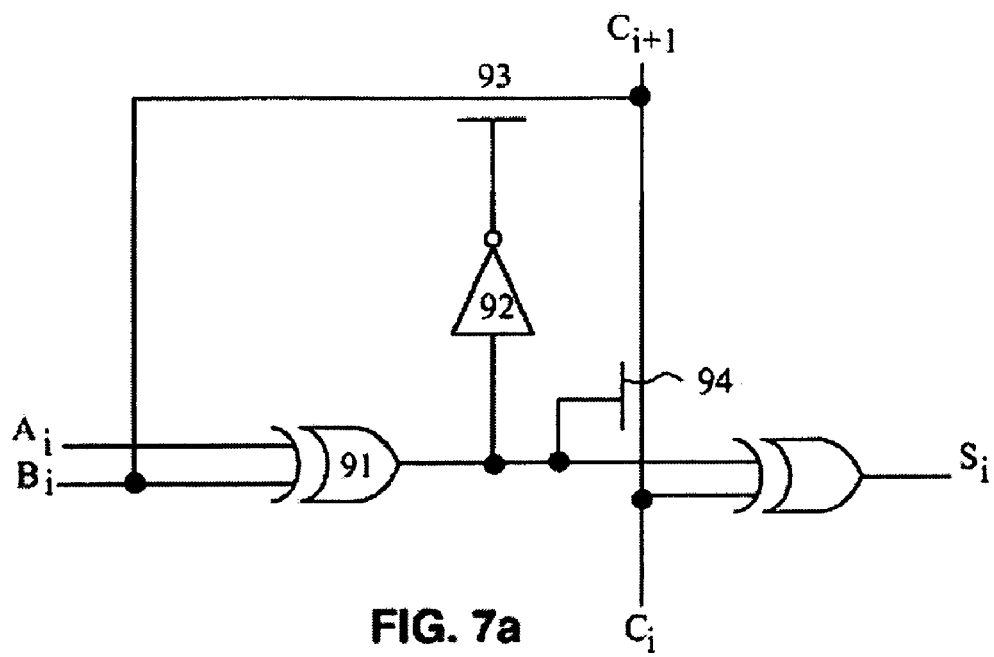
FIG. 7a is a schematic diagram of a circuit providing one bit of a full adder that uses the carry logic.
Figure 7B:
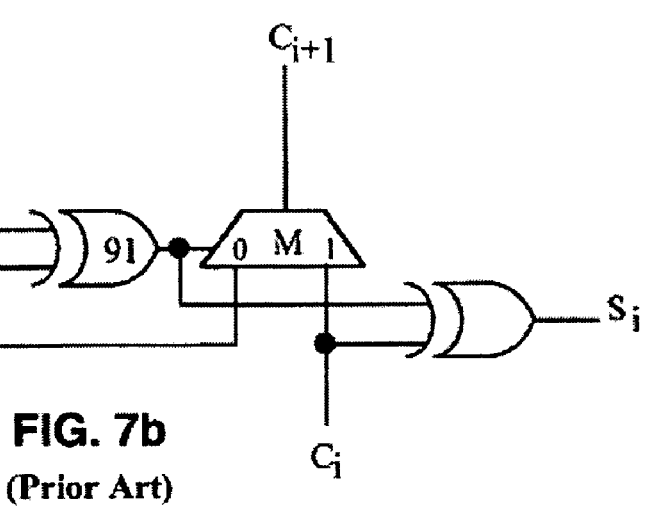
Figure 8A:
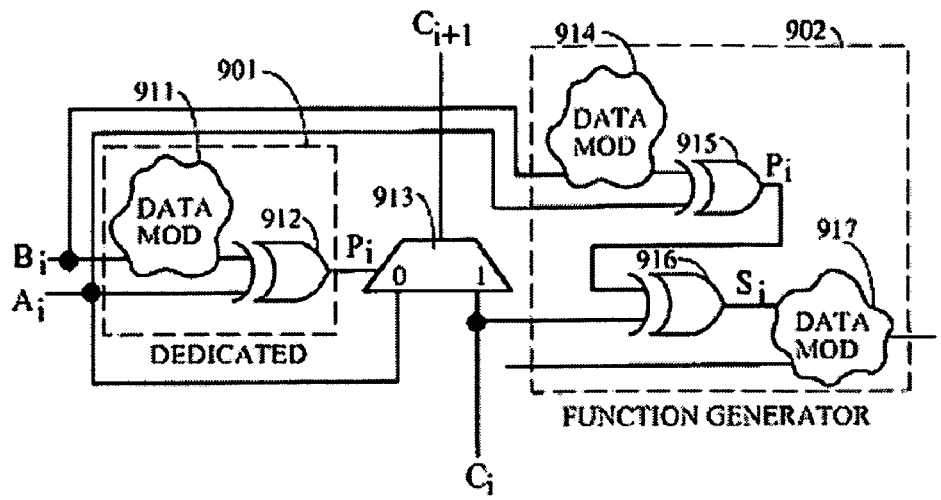
FIG. 8a shows a simplified diagram of the arithmetic portion of the carry logic used in the Xilinx, Inc XC 4000 family of devices.
Figure 8B:
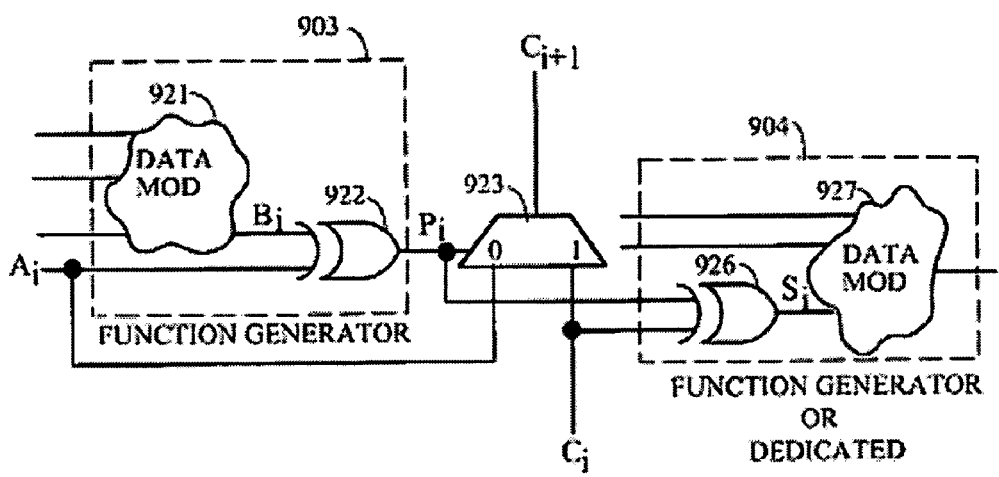
FIG. 8b shows a simplified diagram of the arithmetic portion of the carry logic.
Figure 10:
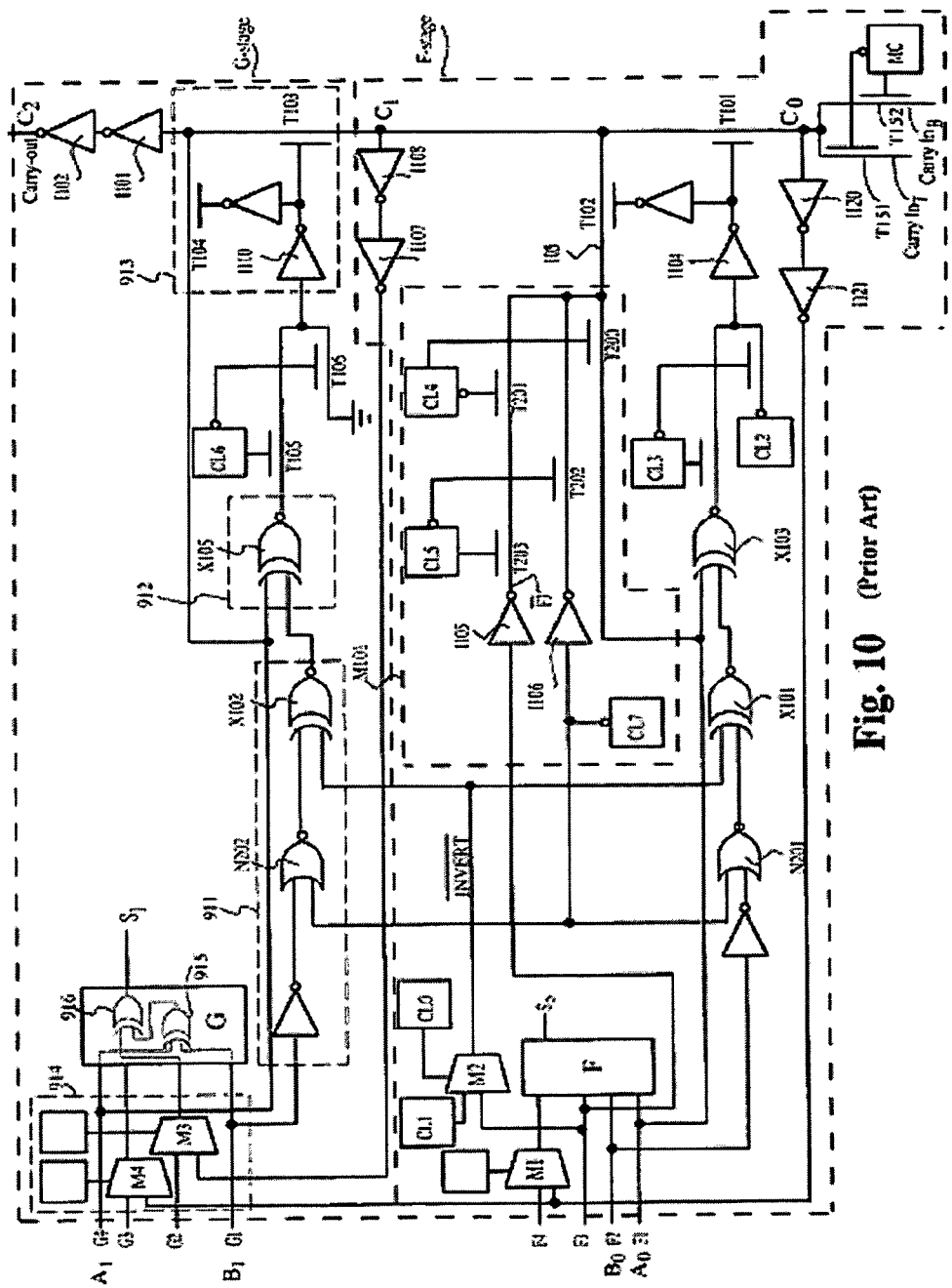
Figure 11A:
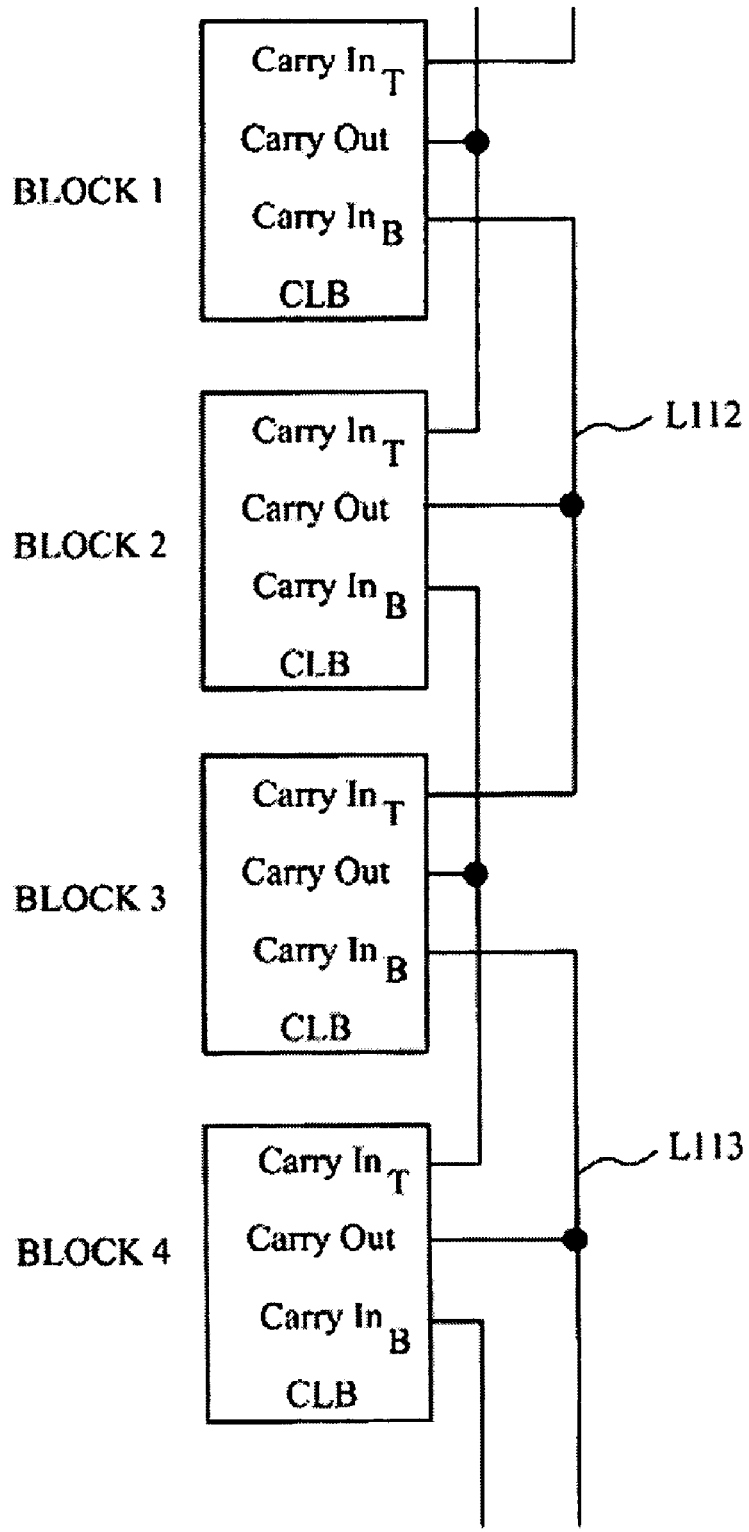
FIG. 11a is a schematic diagram of a logic array showing one embodiment of dedicated-carry-logic interconnect circuitry.
Figure 11B:
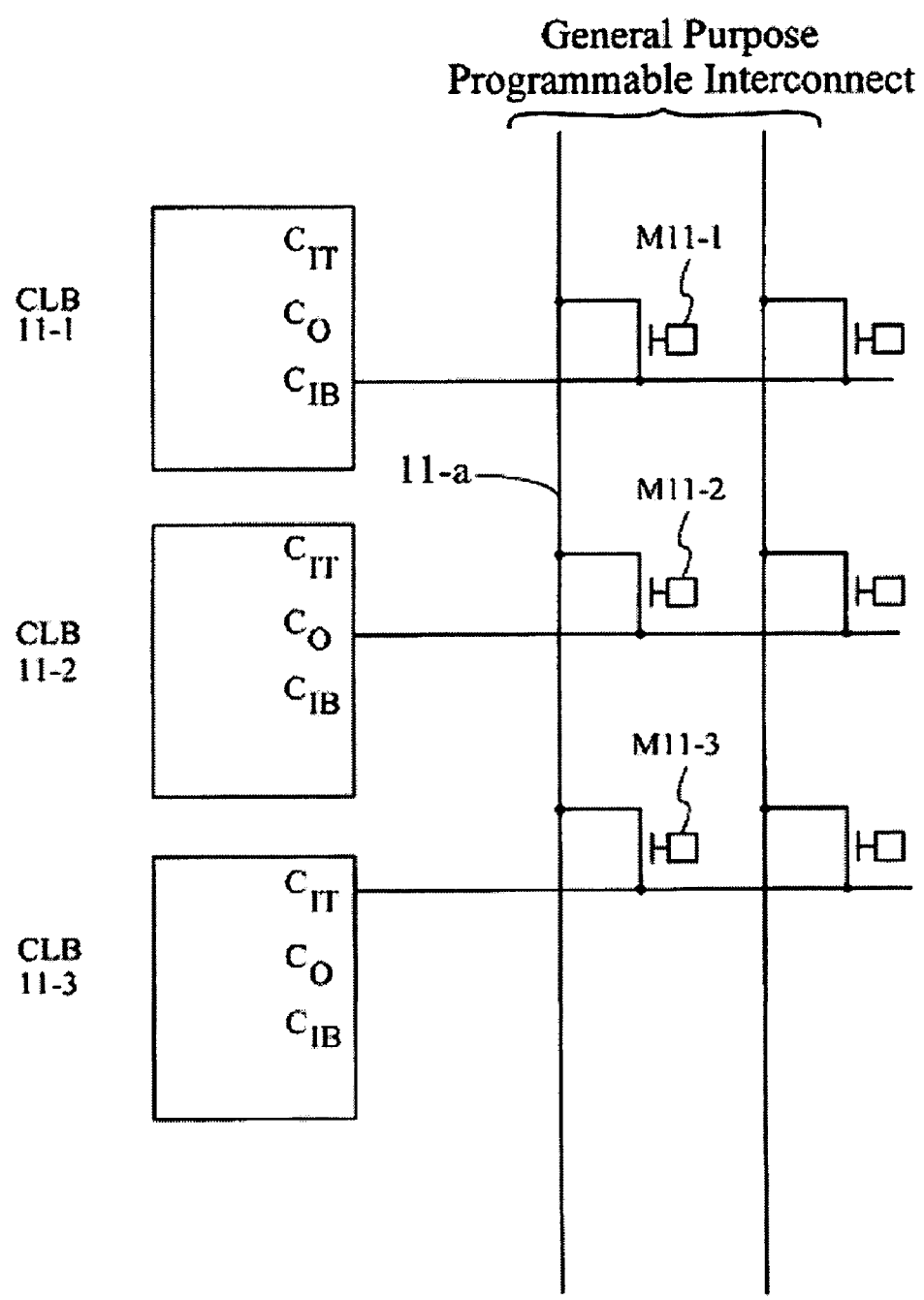
FIG. 11b is a schematic diagram showing an example of carry interconnect circuitry implemented with programmable interconnects.
Figure 11C:
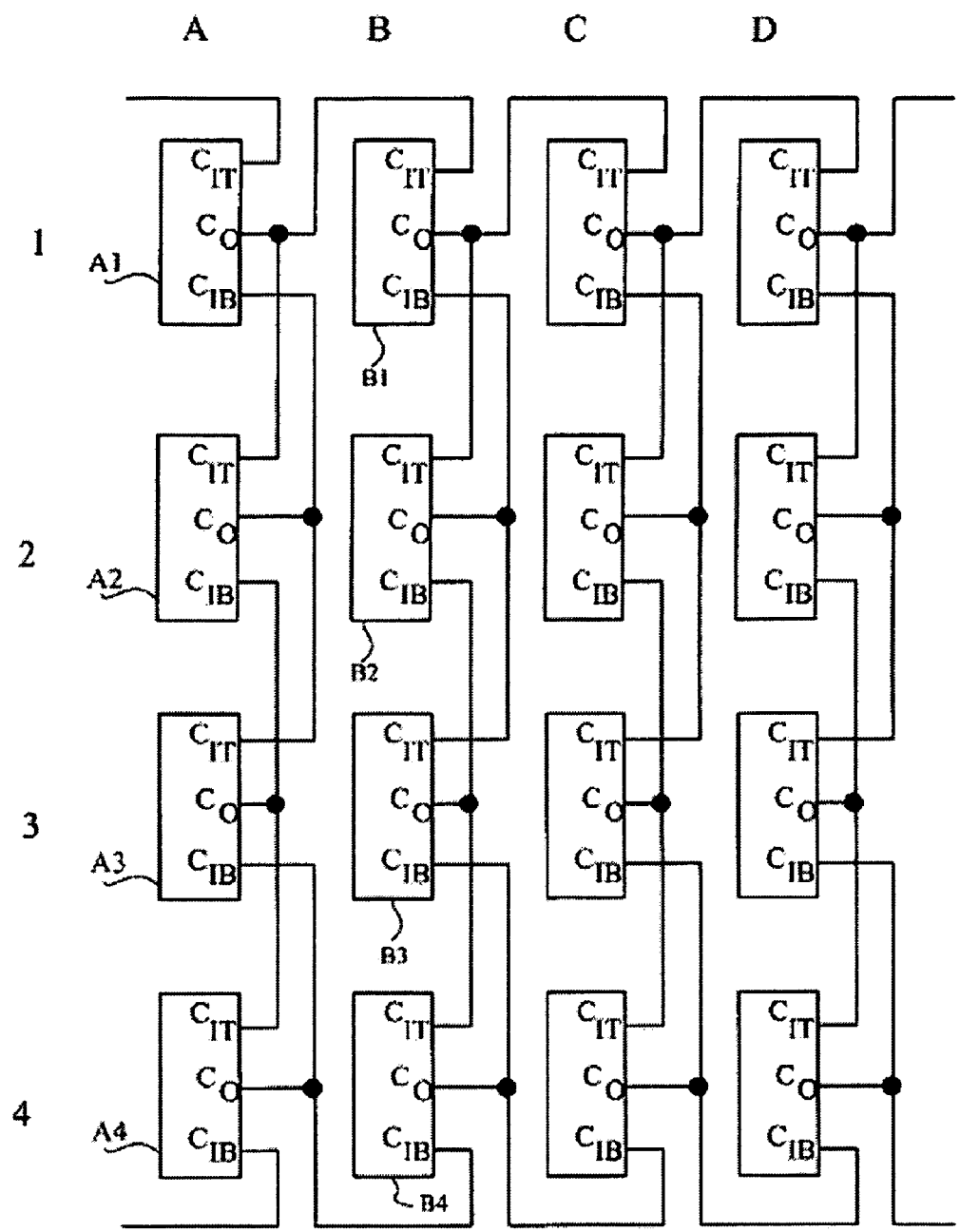
FIG. 11c is a schematic diagram showing one embodiment of dedicated carry logic interconnect circuitry.
Figure 12A:
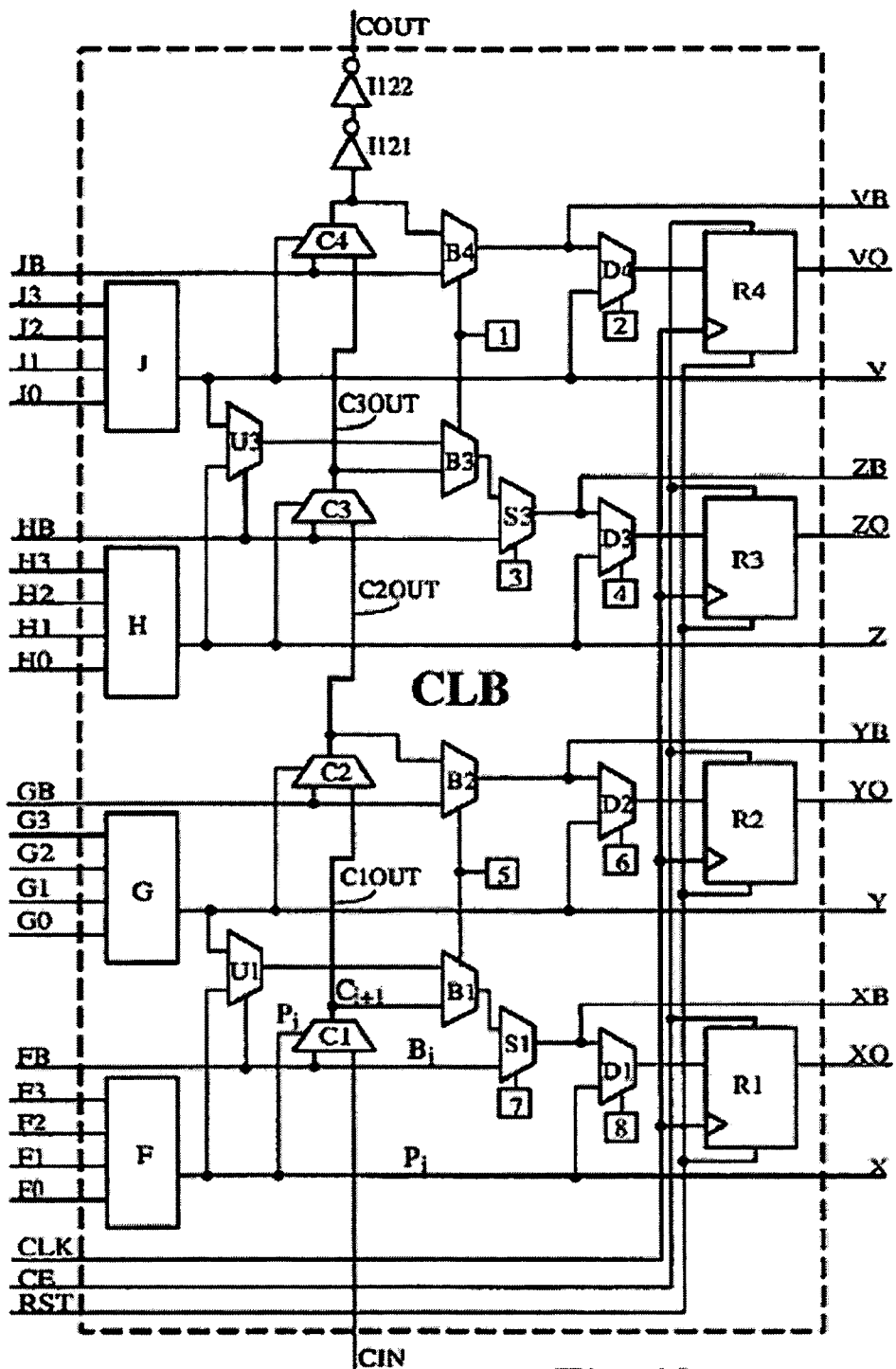
FIG. 12a shows a schematic diagram of a configurable logic block (CLB) having four stages, which implements the circuit of FIG. 8b when combined with another CLB for computing the sum.
Figure 12B:
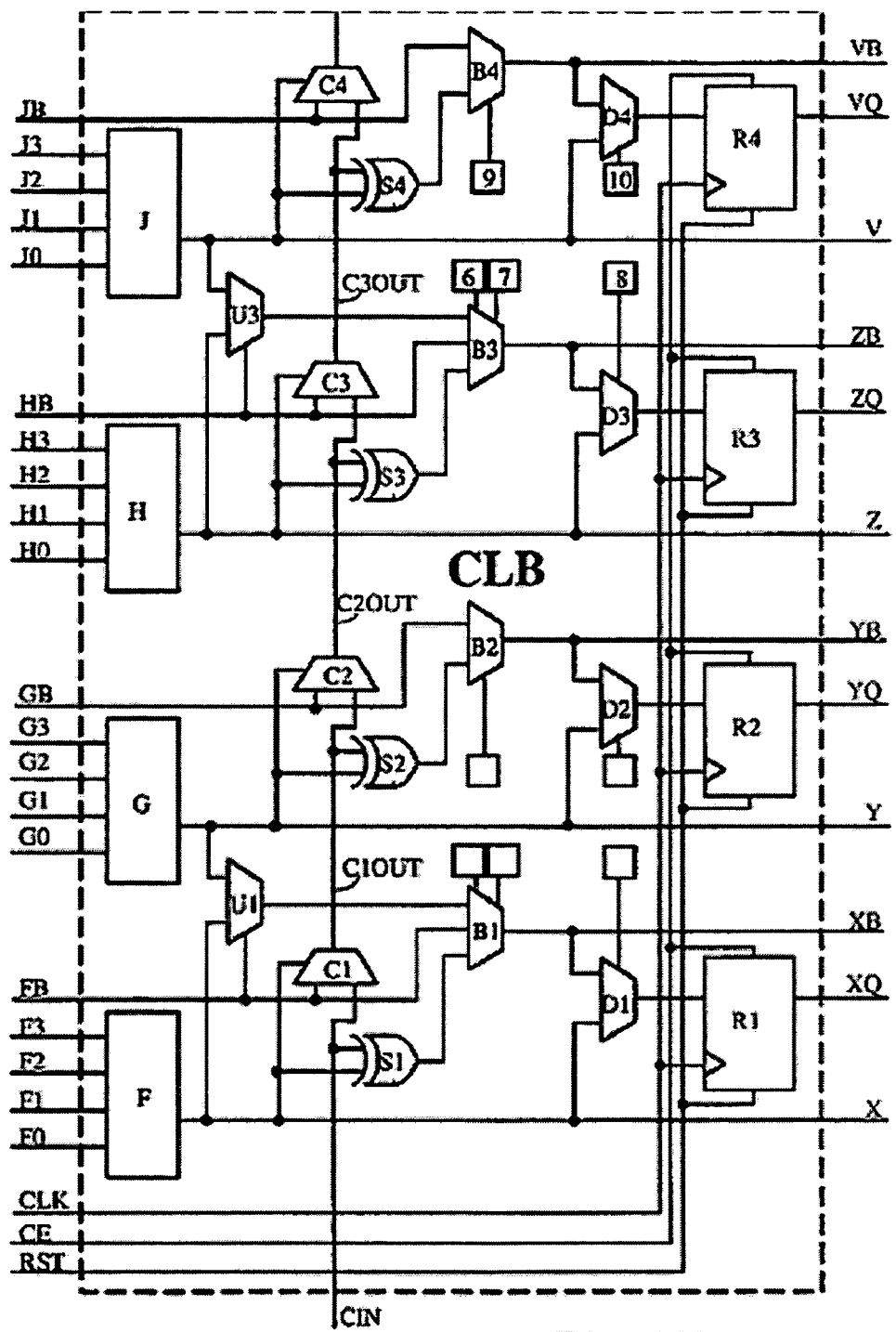
FIG. 12b shows another CLB, which implements the circuit of FIG. 8b by using dedicated hardware for computing the sum.
Figures 13A, 13B:
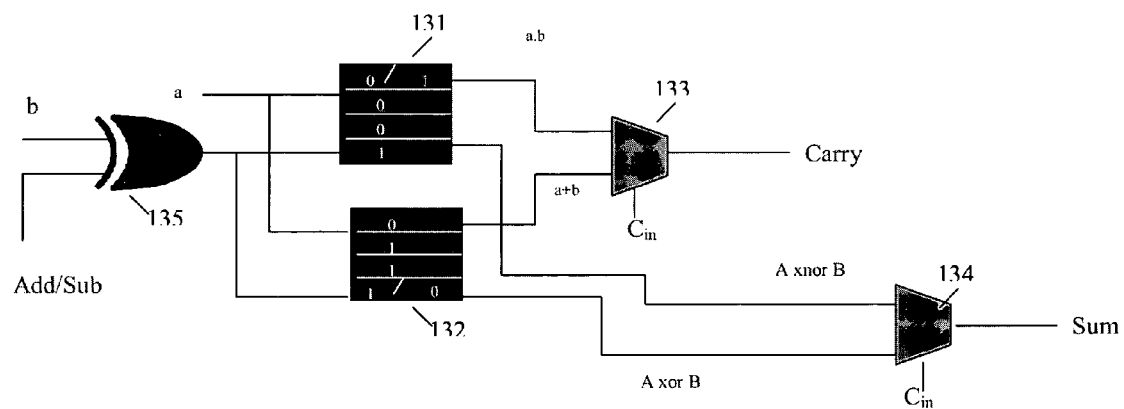
FIG. 13(a) represents the truth table for addition of two bits.
FIG. 13(b) shows the block diagram of adder using LUTs in accordance with the invention.

FIG. 13(a) represents the truth table for addition of two bits. It has A and B as its inputs with S as the sum of the two bits. $C_{in}$ is the carry in while $C_{out}$ is the carry out. An interesting point can be noted from it. The bits in first four rows of S are same as bits in last four rows of $C_{out}$ except the last bit i.e. the output S corresponding to $C_{in}=0$ and the output $C_{out}$ corresponding to $C_{in}=1$ are same except for the last bit.

Similarly, the bits in first four rows of $C_{out}$ are same as bits in last four rows of S except the last bit i.e. the output $C_{out}$ corresponding to $C_{in}=0$ and the output S corresponding to $C_{in}=1$ are same except for the first bit.

FIG. 13(b) shows the block diagram of adder using LUTs in accordance with the invention. It comprises of two LUTs (131) and (132), multiplexers (133) and (134) and an XOR gate (135) with interconnections as shown. The upper 2:4 LUT (131) has a replicated upper bit while lower bit in lower LUT (132) is replicated. Depending on the input bits A and B, corresponding row is selected and thereby the stored bit is outputted.

When addition of two bits is to be performed and if $C_{in}=0$ then S is obtained from the upper LUT (131) which has logic function XNOR of A and B stored while if $C_{in}=1$ the lower LUT (132) provides S which has logic function XOR of A and B stored.

Similarly, carry is obtained i.e. if $C_{in}=0$ then $C_{out}$ is obtained from the upper LUT (131) which has logic function AND of A and B stored while if $C_{in}=1$ the lower LUT (132) provides $C_{out}$ which has logic function OR of A and B stored.

Thus, the value of $C_{in}$ acts as a select bit for multiplexers (133) and (134) to provide carry ($C_{out}$) and sum (S) respectively at the outputs.

The "/" above represents replicated bit inside the LUT. As evident the first bit in the first LUT (131), and the last bit in the second LUT (132), together provide an entity for the simultaneous sum and carry generation.

The XOR gate (135), which has bit B and Add/Sub bit at its input, decides whether addition or subtraction is to be performed.

As can be seen, the carry gets generated with a delay of multiplexer select line to output, which is very less. Also should be noted that the Sum is generated with exactly the same delay with no extra XOR delay etc.

Figure 14:
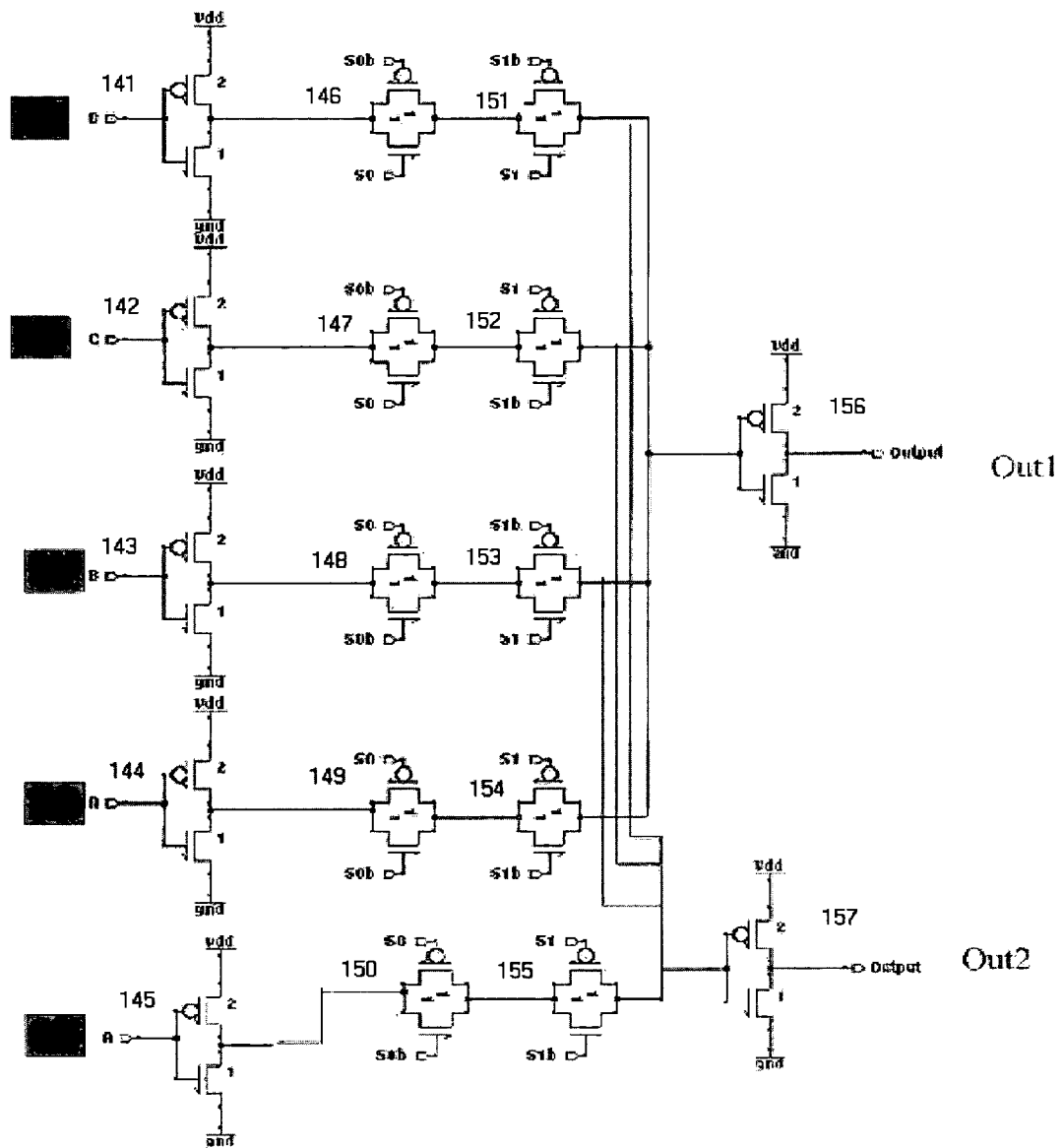
FIG. 14 describes the internal architecture of LUT in accordance with the invention.

FIG. 14 describes the internal architecture of LUT in accordance with the invention. The LUT architecture has been modified. It comprises of five inverters 141-145, plurality of memory elements e.g. SRAM cells 146-155, two inverters 156, 157 and two output taps OUT1 and OUT2. Output tap 1 multiplexes between outputs of memory cells 151, 152, 153 and 154 while output tap 2 multiplexes between outputs of memory cells 151, 152, 153 and 155.

It can be seen that the input A is fed to inverter 144 and 145. Basically input A represents the replicated bit of the LUT.

Referring to LUT 131 of FIG. 13 if the desired output is 0001 then OUT1 is selected and if desired output is 1001 then OUT2 is selected.

Thus by adding two SRAM cells and two inverters same LUT can be used to output sum as well as carry. The same entity can be extended to half adder units, multipliers, decoders and other macro implementations by introduction of a special entity proposed here.

FIG. 15 shows one embodiment of the invention. A product term is generated in accordance with the equation $A.B+C_{in}$. To implement this, the above entity is insufficient as $C_{out}$ should be zero when input carry=0 while it should be equal to A.B when carry=1 as shown in truth table 15(a).

From the truth table we infer that the bits in first four rows corresponding to sum (S) and the bits in last four rows corresponding to carry (C) are exactly same. Also, the bits in first four rows of (C) are all zero. To achieve the desired functionality, the diagram of FIG. 13 is modified. Multiplexer $M_x$ used is modified as shown in FIG. 15(b).

$M_1$ is the configuration bit inside FPGA. When $M_1=0$, the multiplexer circuit output is that of a normal multiplier i.e. A and B, but when $M_1=1$, the output is q and $C_{in}$, thus outputting zeros for all combinations of A and B when $C_{in}=0$.

Figure 16:
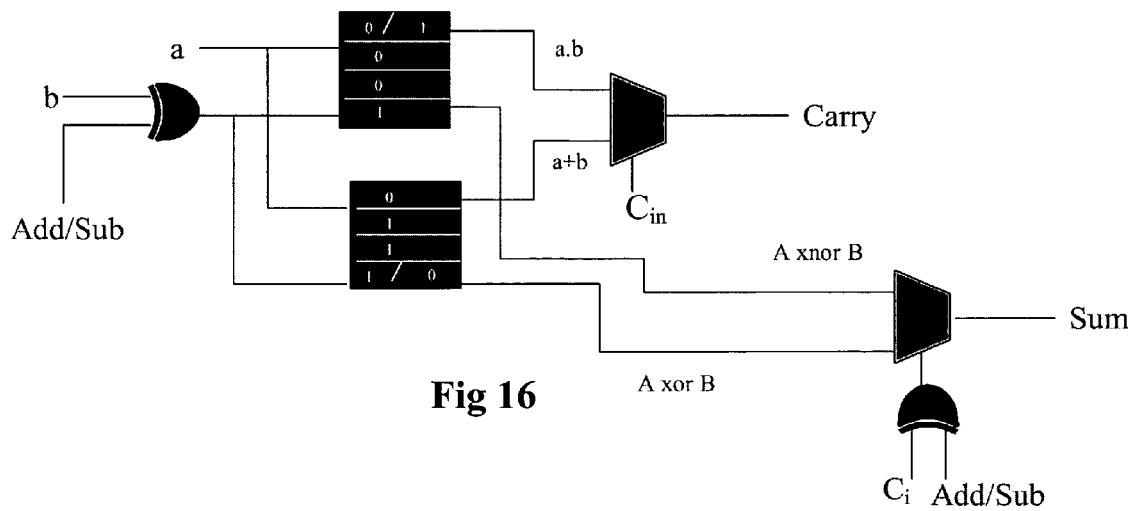
FIG. 16 shows another embodiment in accordance with the invention to implement subtraction operation.

Another embodiment of the instant invention is shown in FIG. 16. It can be used to implement normal subtraction apart from two's Complement Subtraction. This can be done by incorporating an additional XOR gate at the selection terminal of multiplexer 132 of FIG. 13. The XOR gate thus has $C_{in}$ and Add/Sub as its input.

Further, the lower XOR implementation for SUM in the two input LUT could be used to implement Carry Skip Adder by simple tapping out of the XOR outputs and then their subsequent usage in Carry selection, or with dedicated hardware incorporated for the same. Various alternative adder implementations exist which provide faster implementation by using some extra hardware, like carry select and carry by pass adders.

Facilitation for one of such specialized adder exists in U.S. Pat. No. 6,359,468 by Alterra Corp. The architecture used in said patent for addition is realized by storing the XORed value of the two inputs in the LUT as applicable to the FPGA architecture. Carry bypass adders have the best area delay product and hence in entities like FPGA, where hardware is dedicated, and area saving is critical.

Figure 17:
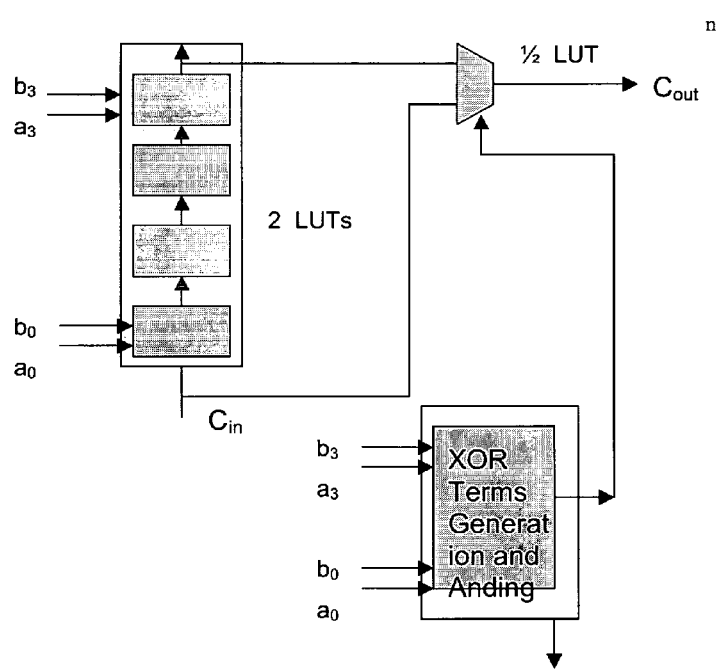
FIG. 17 shows prior art used for carry bypass adder generation.

Many other architectures rely on the same basic principle of storing XORed input in LUT and realizing SUM and Carry generation through external hardware. In all such hardwares, if we implement carry by pass adder let us say 4 bit, we need 5.5 LUTs as shown in FIG. 17. Further, since these signals need to be routed, the implementation does not prove fast at all.

It should be noted that the XOR terms that we need for the carry bypass are already present in the LUTs or the implementation of the adder. Thus, if those terms are taken output separately, and ANDed, we can fasten the existing carry chain itself, thus making carry by pass as the standard implementation, reducing the hardware overhead and fastening the adder.

Figure 18:
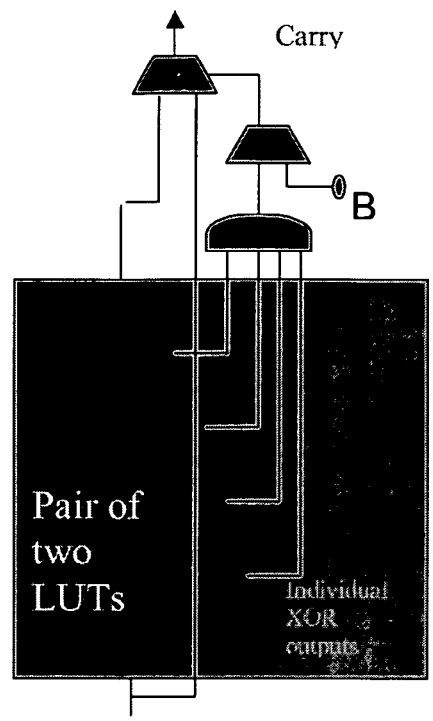
FIG. 18 shows carry bypass adder generation according to the invention.

The carry bypass adder is implemented as shown in FIG. 18.

Figure 19:
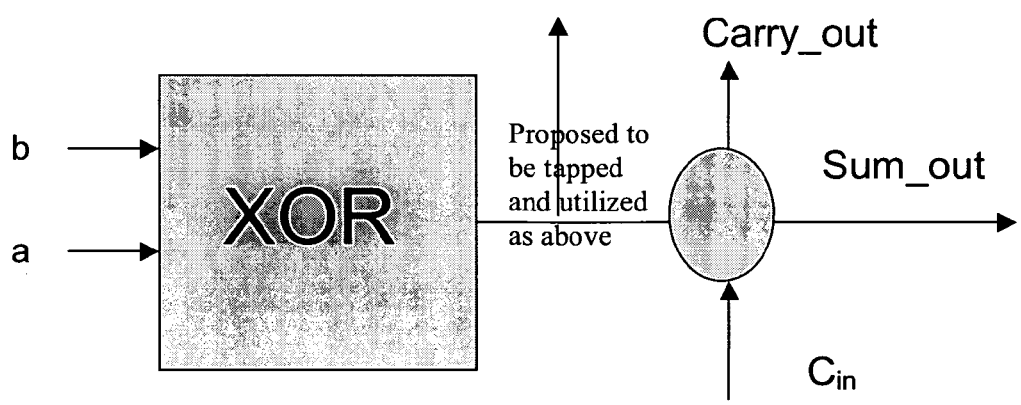
FIG. 19 shows an individual adder entity.

The individual adder entity is shown in FIG. 19. This arrangement facilitates to make our normal adder chain into a carry skip chain with minimum overhead (that of an And gate and MUX). The speed benefit obtained is enormous. Further, it should be observed that the B bit in the diagram above can also be used to by pass the input carry to the upper LUTs, in case lower LUTs implement glue logic, this makes adder implementation flexible i.e. when bit B is struck at 0/1, we can let the generated carry or the input carry to by pass to the next stage independent of the AND gate.

An embodiment of the same also include the tapping of XOR outputs through some other hardware, let us say carry tapout etc. and subsequent utilization for carry by pass adder implementation.

Also to extract 2:4 decoder functionality from a LUT, normally a four input LUT is decomposed into two 3 input LUTs and used. Moreover one LUT resources are wasted as only tapping function is performed by it. Thus by using the above architecture carry is propagated as well as tapped without wasting one LUT resources.

FIG. 20(a) represents the truth table of a 4:2 encoder. The inputs I0, I1, I2 and I3 are encoded depending upon the value of select lines S0 and S1.

FIG. 20(b) shows 4:2 encoder implemented using the circuit employed in the instant invention. When I1 is 0 it represents binary equivalent of zero but when it is 1 it represents binary equivalent of 1, 2 or 3. Hence at the output of multiplexer 203 ORed value of I1 and I3 is obtained. When I2=0 lower LUT 202 is selected while when I2=1 upper LUT is selected thereby outputting I2 OR I3 at the output of multiplexer 304.

FIGS. 21(a) and 21(b) shows 2:4 decoder implementation using circuit of the instant invention. FIG. 21(a) contains configurable multiplexers 211 and 212 to support input selection. The LUTs 213 and 214 are connected to the modified multiplexers 215 and 216. Similarly FIG. 21(b) contains configurable multiplexers 217 and 218 to support input selection. The LUTs 219 and 220 are connected to the modified multiplexers 221 and 222. The configurable bit of multiplexers 215, 216, 221 and 222 are programmed inside the FPGA. When A=0 and B=0 then bit 1 is passed to the output of multiplexer 215 while when A=0 and B=1 then bit 1 is passed to the output of multiplexer 216. Similarly, when A=1 and B=0 then bit 1 is passed to the output of multiplexer 221 while when A=1 and B=1 then bit 1 is passed to the output of multiplexer 222, thus implementing the functionality of decoder using Lookup tables.

FIG. 22(a) and 22(b) shows product term generation using circuit of the instant invention. Multiplexers 225 and 226 in FIG. 22(a) are configurable multiplexers used to select one the many inputs. The multiplexer 229 generates the product of inputs A and B using the bits stored in LUT 227 with its select line having zero stored on it. The multiplexer 230 generates the product of either inputs A and C or input A and B. When input C is 0 the multiplexer 230 outputs product of inputs A and B while when input C is 1 the multiplexer 230 outputs product of input A and C.

Multiplexers 231 and 232 in FIG. 22(b) are configurable multiplexers used to select one the many inputs. The multiplexer 235 generates the product of inputs C and D using the bits stored in LUT 233 with its select line having zero stored on it. The multiplexer 236 generates the product of either inputs A and D or input A and C. When input A is 0 the multiplexer 236 outputs product of inputs A and D while when input A is 1 the multiplexer 236 outputs product of input A and C.

The above scheme thus generates Product Terms giving four product terms per LUT. It is intended that the present invention encompass such changes and modifications as fall within the scope of the appended claims.

What is claimed is:

1. A logic entity with two outputs, comprising:
   a first lookup table capable of generating a first output for the carry out value for a carry-in of zero and a second output for the sum value for a carry-in of one;
   a second lookup table capable of generating a first output for the carry out value for a carry-in of one and a second output for the sum value for a carry-in of zero;
   a first multiplexer having a first input associated with the first output of the first lookup table and a second input associated with the first output of the second lookup table, the first multiplexer providing a carry output; and
   a second multiplexer having a first input associated with the second output of the first lookup table and a second input associated with the second output of the second lookup table, the second multiplexer providing a sum output.

2. The logic entity as claimed in claim 1 wherein at least one of said first and said second lookup tables comprises:
   a plurality of input inverters;
   a first and a second SRAM cell connected in series with each said inverter; and
   plurality of output inverters connected to an output of each of said second SRAM cells.

3. The logic entity as claimed in claim 2 wherein an input of a first output inverter is connected to the output of a first four of said second SRAM cells.

4. The logic entity as claimed in claim 2 wherein an input of a second output inverter is connected to the output of a first three and a fifth of said second SRAM cells.

5. The logic entity as claimed in claim 1 wherein said first multiplexer comprises:
   a first AND gate with a first input connected to receive a configuration bit and a second input connected to receive a carry in;
   a second AND gate with a first input connected to receive the first output of the first lookup table and a second input connected to receive a carry in;
   a third AND gate with a first input connected to receive the first output of the second lookup table and a second input connected to receive a carry in;
   an OR gate connected to receive the outputs of said second and third AND gates as its inputs, and
   a fourth AND gate connected to receive the output of said OR gate and the output of said first AND gate as its inputs,
   wherein the output of the fourth AND gate can be selectively forced to a desired value according to the configuration bit.

6. The logic entity as claimed in claim 5 wherein said desired value is a logical zero or one.

7. The logic entity as claimed in claim 5 wherein said configuration bit is a logical zero or one.

8. The logic entity as claimed in claim 1 wherein said second multiplexer includes a conventional multiplexer.

9. The logic entity as claimed in claim 1 further comprising an XOR gate having a first input connected to an output of the first lookup table and a second input connected to an output of the second lookup table.

10. The logic entity as claimed in claim 1 wherein said improved logic entity is configured to operate as part of a device selected from the group consisting of encoders, decoders, adders, subtracters, product term generators and multipliers.

11. A logic apparatus receiving as input logic bits A and B, comprising:
- a first lookup table capable having a first output and a second output, wherein the first output corresponds to a first logical function of A and B and the second output corresponds to a second logical function of A and B;
- a second lookup table capable having a first output and a second output, wherein the first output corresponds to a third logical function of A and B and the second output corresponds to a fourth logical function of A and B;
- a first multiplexer having a first input associated with the first output of the first lookup table, a second input associated with the first output of the second lookup table, and a select input associated with a carry-in bit, the first multiplexer providing a carry output; and
- a second multiplexer having a first input associated with the second output of the first lookup table, a second input associated with the second output of the second lookup table, and a select input associated with the carry-in bit, the second multiplexer providing a sum output.

12. The logic apparatus as claimed in claim 11 wherein at least one of said first and said second lookup tables comprises:
- a plurality of input inverters;
- a first and a second SRAM cell connected in series with each said inverter; and
- plurality of output inverters connected to an output of each of said second SRAM cells.

13. The logic apparatus as claimed in claim 11 wherein the first logical function is A AND B.

14. The logic apparatus as claimed in claim 11 wherein the second logical function is A XNOR B.

15. The logic apparatus as claimed in claim 11 wherein the third logical function is A OR B.

16. The logic apparatus as claimed in claim 11 wherein the first logical function is A XOR B.

17. The logic apparatus as claimed in claim 11 further comprising an input for selecting a function.

18. The logic apparatus as claimed in claim 11 further comprising a logic gate configured to accept a first logical value input bit and a function selection input bit, and to produce output B according to the first logical value input bit and the function selection input bit.

19. The logic apparatus as claimed in claim 18 wherein said the function selection input bit indicates an addition function or a subtraction function.

20. The logic apparatus as claimed in claim 11 wherein the carry output corresponds to a carry-out bit resulting from the addition of A and B and the carry-in bit, and the sum output corresponds to the sum of A and B and the carry-in bit.

* * * * *

UNITED STATES PATENT AND TRADEMARK OFFICE
CERTIFICATE OF CORRECTION

| | | |
|---|---|---|
| PATENT NO. | : 7,617,269 B2 | Page 1 of 1 |
| APPLICATION NO. | : 11/196797 | |
| DATED | : November 10, 2009 | |
| INVENTOR(S) | : Hitanshu Dewan | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1131 days.

Signed and Sealed this

Nineteenth Day of October, 2010

David J. Kappos
*Director of the United States Patent and Trademark Office*